United States Patent
Arnold et al.

(10) Patent No.: US 12,412,009 B1
(45) Date of Patent: Sep. 9, 2025

(54) SYSTEM AND METHOD FOR SIMULATION OF MULTIPLE DYNAMIC SYSTEMS INVOLVING MOVEMENT OVER TIME

(71) Applicant: Divining Lab, LLC, Los Angeles, CA (US)

(72) Inventors: Hadley Hovenden Soutter Arnold, Los Angeles, CA (US); Peter Josef Arnold, Los Angeles, CA (US)

(73) Assignee: diviningLAB, LLC, Los Angeles, CA (US)

( * ) Notice: Subject to any disclaimer, the term of this patent is extended or adjusted under 35 U.S.C. 154(b) by 819 days.

(21) Appl. No.: 17/496,681

(22) Filed: Oct. 7, 2021

(51) Int. Cl.
*G06F 30/27* (2020.01)
*G06F 113/08* (2020.01)

(52) U.S. Cl.
CPC .......... *G06F 30/27* (2020.01); *G06F 2113/08* (2020.01)

(58) Field of Classification Search
None
See application file for complete search history.

(56) References Cited

U.S. PATENT DOCUMENTS

| | | | |
|---|---|---|---|
| 10,664,937 B2 | 5/2020 | Wani et al. | |
| 2014/0156232 A1* | 6/2014 | Cordazzo | G01W 1/10 703/2 |
| 2019/0316309 A1 | 10/2019 | Wani et al. | |

FOREIGN PATENT DOCUMENTS

| | | |
|---|---|---|
| CN | 111832810 | 10/2020 |
| CN | 112182990 | 1/2021 |
| CN | 109299812 | 9/2021 |
| CN | 109272146 | 10/2021 |
| KR | 10-2236678 | 4/2021 |

OTHER PUBLICATIONS

Lei, Urban flood modeling using deep-learning approaches in Seoul, South Korea, Jul. 18, 2021 (Year: 2021).*

(Continued)

*Primary Examiner* — Emerson C Puente
*Assistant Examiner* — Michael Paul Mirabito
(74) *Attorney, Agent, or Firm* — PATENT LAW WORKS LLP

(57) ABSTRACT

A system and method for simulating multiple dynamic flows involving movement over time, for example, of water and other fluids, air or wind, fire, or the like, is disclosed. The system and method are a visualization and simulation platform designed to create and execute an approach using deep-learning, computer vision, image processing, and artificial intelligence for predicting all manners of dynamic physical motion over time. The visualization and simulation system is configured to quickly model and predict dynamical physical phenomena including, but not limited to, movement of water or air flow or fire in any topography. The visualization and simulation system predicts flooding behavior patterns in "known" geographical domains (regions and/or areas where the deep-learning system has been explicitly trained on) as well as "unknown" geographical domains (regions and/or areas where the deep-learning system has not been previously exposed or trained on) by providing time-dependent two-dimensional hydrodynamic flooding predictions.

20 Claims, 20 Drawing Sheets

(56) References Cited

OTHER PUBLICATIONS

Jin Noh, Hyper-resolution 1D-2D urban flood modelling using LiDAR data and hybrid parallelization, Mar. 2, 2018 (Year: 2018).*
Screen captures from YouTube video clip entitled "FLO 2D Crayfish Animation," 7 pages, uploaded on Oct. 11, 2020 by user "FLO-2D Software". Retrieved from Internet: < https://www.youtube.com/watch?v=rLnPxCkiahw>. (Year: 2020).*
ASCE Task Committee on Application of Artificial Neural Networks in Hydrology, "Artificial Neural Networks in Hydrology. I: Preliminary Concepts," Journal of Hydrologic Engineering, vol. 5, No. 2, Apr. 2000, pp. 115-123.
ASCE Task Committee on Application of Artificial Neural Networks in Hydrology, "Artificial Neural Networks in Hydrology. II: Hydrologic Applications," Journal of Hydrologic Engineering, vol. 5, No. 2, Apr. 2000, pp. 124-137.
Chu et al., "An ANN-based emulation modelling framework for flood inundation modelling: Application, challenges and future directions," Environmental Modelling and Software, 124 (2020) 104587, Nov. 16, 2019, https://doi.org/10.1016/j.envsoft.2019.104587, 17 pgs.
Comer et al., "Development of high-resolution multi-scale modelling system for simulation of coastal-fluvial urban flooding," Natural Hazards and Earth System Sciences, 17, Feb. 16, 2017, pp. 205-224. Available online at www.nat-hazards-earth-syst-sci-.net/17/2015/2017/doi:10.5194/nhess-17-205-2017.
French et al., "Combining machine learning with computational hydrodynamics for prediction of tidal surge inundation at estuarine ports," Procedia IUTAM 25 (2017), pp. 28-35.
Jiang et al., "Simulation-Based Exceedance Probability Curves to Assess the Economic Impact of Storm Surge Inundations due to Climate Change: A Case Study in Ise Bay, Japan," Sustainability, 11, 1090, doi:10.3390/su11041090, published Feb. 19, 2019, www.mdpi.com/journal/sustainability, 15 pgs.
Pender et al., "Rapid Flood Inundation Modelling: Meta-Modelling of 2D Hydrodynamic Model Using Artificial Intelligence Techniques—Support Vector Regression, Modified Linear Interpolation and Cellular Automata," Flood Risk Management Research Consortium Research Report WP1.3, Project Website: www.floodrisk.org.uk, May 2011, 31 pgs.
Schubert et al., "Building treatments for urban flood inundation models and implications for predictive skill and modeling efficiency," Advances in Water Resources, 41 (2012), http://dxdoi.org/10.1016/j.advwatres.2012.02.012, pp. 49-64.
Stoecklein et al., "Deep Learning for Flow Sculpting: Insights into Efficient Learning using Scientific Simulation Data," Scientific Reports, 7:46368, DOI: 10.1038/srep46368, www.nature.com/scientificreports, Apr. 12, 2017, 11 pgs.
Tompson et al., "Accelerating Eulerian Fluid Simulation With Convolutional Networks," Proceedings of the 34th International Conference on Machine Learning, Sydney, Australia, Jun. 22, 2017, arXiv:1607.03597v6, 10 pgs.
Guo et al., "Convolutional Neural Networks for Steady Flow Approximation," 22nd ACM SIGKDD Conference on Knowledge Discovery and Data Mining, Aug. 13-17, San Francisco, California, DOI: http://dx.doi.org/10.1145/2939672.2939738, pp. 481-490. Aug. 2016.

* cited by examiner

DYNAMIC EVENT PROGRESSION

800

SYSTEM AND METHOD FOR SIMULATION OF MULTIPLE DYNAMIC SYSTEMS INVOLVING MOVEMENT OVER TIME

BACKGROUND OF THE INVENTION

1. Field of the Invention

The present invention relates to a system and method for simulating multiple dynamic flows involving movement over time, for example, of water and other fluids, air or wind, fire, or the like. In particular, the present invention relates to a visualization and simulation system designed to create and execute an approach using deep-learning, computer vision, image processing, and artificial intelligence for predicting all manners of dynamic physical motion over time. The visualization and simulation system in accordance with the present invention is configured to quickly model and predict dynamical physical phenomena including, but not limited to, movement of water or air flow or fire in any topography. In accordance with one particular embodiment of the present invention, the visualization and simulation system of the present invention predicts flooding behavior patterns in "known" geographical domains (regions and/or areas where the deep-learning system has been explicitly trained on) as well as "unknown" geographical domains (regions and/or areas where the deep-learning system has not been previously exposed or trained on) by providing time-dependent two-dimensional hydrodynamic flooding predictions.

2. Description of the Prior Art

Natural and other disasters caused by floods, fires, and hurricanes result in devastation and unimaginable losses. For example, in one scenario, risk of floods may be a function of flood hazards (e.g., hurricanes and/or damage to a levee or dam), property exposure to these hazards, and the damage vulnerability of properties during a flood. Comprehensive flood risk assessment and flood loss mitigation planning are desirable to address these types of events. In the United States alone, floods have accounted for significant property losses and business interruption affecting thousands of companies and people each year. According to the United States Census Bureau, in 2005, the flooding from Hurricane Katrina caused over $40 billion in property damage, led to over 1600 deaths, and affected over 250,000 businesses. Federal, public, and private measures on flood loss mitigation, insurance and reinsurance are vehicles to reducing the financial risk to individuals, businesses and even entire communities. Mortgage companies, public sectors (from the Federal Emergency Management Agency (FEMA) to municipalities), capital markets, insurance, and reinsurance companies continuously seek information and data on frequencies of floods, flood elevations, and frequencies of flood inundation losses in different terrains before underwriting sufficient and comprehensive policies for these properties or otherwise factoring related analyses into their decisions.

Traditionally flood risk for both residential and commercial properties within the United States have typically been determined by whether the properties were within or outside Federal Emergency Management Agency ("FEMA") Special-Flood-Hazard Areas ("SFHAs"). For example, whether a property lies inside or outside of an SFHA is sometimes the major risk factor considered in determining whether to purchase flood insurance. Flood risks associated with properties within and beyond SFHAs may be different. In an SFHA, properties located near flood sources with lower elevations may have a higher flood risk than properties near SFHAs boundaries at a higher elevation. Repetitive loss may occur more often in properties at lower elevations because the flood frequencies at lower elevations may be much higher.

Existing approaches have attempted to evaluate losses that occur in the event of danger from such natural or other disasters. Some can predict flow patterns of fires and floods. For example, traditionally, to compute accurate physically-based hydrodynamic modeling results, each desired rainstorm return interval within a given domain is calculated using two-dimensional ("2D") modeling approaches, by solving the shallow water equations ("SWE") over the full rainstorm time period. Although used extensively, this approach is labor, time, and computationally intensive. When solving the two-dimensional SWEs to determine the interaction of free-flowing water across topographic surfaces, shallow water equations ("SWE") are represented in a simplified vector form. Such equations represent a mathematical ideal description of physical reality describing the position, flow rate, and depth of a fluid surface at any given time.

Solving such partial differential equations requires a multistep, highly technical, and computationally lengthy process, and in many situations, prohibitive from an economic standpoint.

However, to approximate solutions, a technique called discretization is utilized. Discretization involves replacing a set of algebraic equations (that do not describe continuous relationships) into the partial differential equations, which allows the continuous (or infinite) relationships of the partial differential equations to be represented by a series of finite points in two-dimensional space and time. These resulting points represent (an approximate) solution to the partial differential equations of fluid flow, such that, when organized into an array, each point describes a unique position within a bounding area or volume. Formally, the array of solution points can be visualized as a three-dimensional mesh, or alternatively, a structure on which the numerical solution is based and built.

Concurrently, there exist some artificial intelligence methods for providing flood forecasting and flood impact analysis. Artificial intelligence data analysis and prediction techniques are used in hydrology. Over the past twenty years or so, gradual improvements to hydrologic flood forecasting using artificial intelligence ("AI") data processing and prediction methods have been made. Machine learning ("ML") models such as those described below have been used for flood prediction. For example, in accordance with one machine learning approach called "support vector machines" ("SVM"), input training data is evaluated and classified as a binary, or two-group condition, either belonging to or not belonging to the set contained and described by the training data. Use of SVM may be applied to both classification and regression problems. SVMs can be used to predict a future state based on training data associated with past conditions. Known examples using the SVM machine learning approach are limited to problems where dimensionality is constrained, for instance, point locations within a river channel to predict stream discharge, or multiple gaging locations within a watershed where stage (water elevation) and discharge rates are desired. Use of SVMs, in either supervised or unsupervised training forms, to reproduce and accurately predict spatially, the two-dimensional hydrodynamic behavior of free-flowing water does not yet exist, to our knowledge.

Also, within the domain of machine learning, artificial neural networks ("ANNs") have been used in modeling one-dimensional flood processes with a high fault tolerance and accurate approximation. Floods are among the most destructive natural disasters, which are highly complex to model. Advancement of flood prediction models has contributed to risk reduction, policy suggestion, minimization of the loss of human life, and reduction of property damage associated with floods. To mimic the complex mathematical expressions of physical processes of floods, machine learning methods have contributed to advancing prediction systems, providing better performance and cost-effective solutions. Due to the vast benefits and potential of machine learning, its popularity has dramatically increased among hydrologists. Some major trends in improving the quality of the flood prediction models include hybridization, data decomposition, algorithm ensemble, and model optimization.

An artificial neural network is a simple learning network in which a layer of input neurons is connected to several intermediate neural layers (either visible or hidden), which are then connected to an output layer of neurons. Within the interconnected layers, feature extraction may be learned and mapped onto subsequent layers. Artificial neural networks have been used to simulate non-complex conditions such as one-dimensional ("1D") river flow and river discharge, primarily within the domain of riverine flooding. Artificial neural networks are the precursor to deep learning neural networks, with substantial differences. Deep learning networks employ vastly larger numbers of connected layers, on the order of 100s to 1000s of layers of neurons.

Feed forward neural networks ("FFNNs") also known as multilayer perceptrons ("MLPs") are the simplest class of artificial neural networks where connections between neural layers are not recurrent, or cyclical in form. Feed forward neural networks are designed to feed information only forward: beginning within input nodes, then to a hidden layer, then mapped onto output nodes.

Yet another class of artificial neural networks are referred to as back-propagation neural networks ("BPNNs"), in which neural layers pass information back to previous layers, dramatically increasing the capability of the learning cycle. Of the various forms of ANNs, BPNNs are widely viewed as the most powerful prediction tools suitable for time-series dependent one-dimensional ("1D") flood analysis. So far, none of these types of neural networks, in either supervised or unsupervised training forms, have been used to reproduce and accurately predict the two-dimensional hydrodynamic spatial behavior of free-flowing flood water.

Traditionally, referred herein as using "traditional methods," numerical simulation describing the interaction of free-flowing water across topographic surfaces requires solving implementations of the shallow water equations ("SWEs"). Represented in a simplified vector form, shallow water equations are the mathematical ideals of physical reality describing the position, flow rate, and depth of a fluid surface at any given time.

$$\frac{\partial h}{\partial t} + \frac{\partial hu}{\partial x} + \frac{\partial hv}{\partial y} = 0 \quad [1]$$

$$\frac{\partial (hu)}{\partial t} + \frac{\partial \left(g\frac{h^2}{2} + hu^2\right)}{\partial x} + \frac{\partial (huv)}{\partial y} = gh(g(S_{0x} - S_{fx})) \quad [2]$$

$$\frac{\partial (hv)}{\partial t} + \frac{\partial (huv)}{\partial x} + \frac{\partial \left(g\frac{h^2}{2} + huv^2\right)}{\partial y} = gh(g(S_{0y} - S_{fy})) \quad [3]$$

where:
u=cross-section averaged flow velocity in the x direction;
v=cross-section averaged flow velocity in the y direction;
g=acceleration due to gravity;
h=cross-sectional averaged water depth;
$S_{0x}$=slope of flow in the x direction;
$S_{0y}$=slope of flow in the y direction; and
$S_{fx}$=friction slope in the x direction (assumes use of Manning's n)=

$$-\left(\frac{n^2 u \sqrt{u^2 + v^2}}{h^{\frac{4}{3}}}\right)$$

$S_{fy}$=friction slope in the y direction (assumes use of Manning's n)=

$$-\left(\frac{n^2 v \sqrt{u^2 + v^2}}{h^{\frac{4}{3}}}\right)$$

Solving these three partial differential equations requires a multistep, highly technical, and computationally lengthy process described cursorily here: Because the shallow water partial differential equations describe the rate of change of a fluid's surface with several continuous variables (depth, location in the x-and-y-axis, velocity in the x-and-y axis, etc.) finding an exact solution to these equations is complex and in many situations is not possible. However, to approximate solutions, a technique called discretization has been used. Discretization involves replacing a set of algebraic equations (equations that do not describe continuous relationships) into the partial differential equations—this allows the continuous (or infinite) relationships of the partial differential equations to be represented by a series of finite points in two-dimensional space and time. These resulting points represent (an approximate) solution to the partial differential equations of fluid flow—when organized into an array, each point describes a unique position within a bounding area or volume. Formally, the array of solution points can be visualized as a three-dimensional mesh—or alternatively, a structure on which the numerical solution is based and built.

It should be recognized by those skilled in the art, that existing solutions present many obstacles. None provide a dynamic visualization and simulation scheme that can be quickly generated with accuracy and few resources and provided via an application programming interface to users, whether they are companies, insurance entities, individuals, or critical emergency management services, each seeking predictive data, models, and simulations for their respective purposes.

SUMMARY OF THE INVENTION

The present invention overcomes the deficiencies and limitations of the prior art at least in part by providing a system and methods for visualizing and simulating dynamic flows with accuracy, speed, and the use of fewer resources at lower costs. The system and methods use machine-assisted learning frameworks, on both known and unknown domains, to generate image-based solutions that accelerate the computation of dynamic flows.

In some embodiments, the system in accordance with the present invention is an intelligent system using deep learning neural networks to accurately generate simulations based on real time data inputs. In one embodiment, the system comprises a flood-prediction engine, a risk-assessment engine, a loss-estimator engine, and an application programming interface (API).

The flood-prediction engine further comprises a two-dimensional (2D) hydrodynamic simulation module, a local-domain training module, a large-domain training module, an adaptive-up-and-down-scaling module, and a probabilistic-forecast coupling module.

In some embodiments, neural networks are created and trained by learning the time-dependent, two-dimensional hydrodynamic simulations on domains of large and small (local) areas. These simulations are provided as input into the flood-prediction engine. Simulations of known domains are used to create simulations for unknown domains.

In some embodiments, neural networks efficiently process and train on new topologies, and in doing so, produce new and more accurate training data, while subsequently making the flood prediction engine more efficient and capable of yielding more accurate results. The neural network created solves the problem hindering traditional methods of lengthy computational requirements by rapidly generating simulations, up to $10^6$ times faster than traditional methods. The neural network is configured to continuously expand with relevant data. The dynamic visualization and simulation system adapts to the input it receives and generates outputs with low error rates.

BRIEF DESCRIPTION OF THE DRAWINGS

The present invention is illustrated by way of example, and not by way of limitation in the figures of the accompanying drawings in which like reference numerals are used to refer to the same or similar elements.

DETAILED DESCRIPTION OF THE EMBODIMENTS

Figure 1:
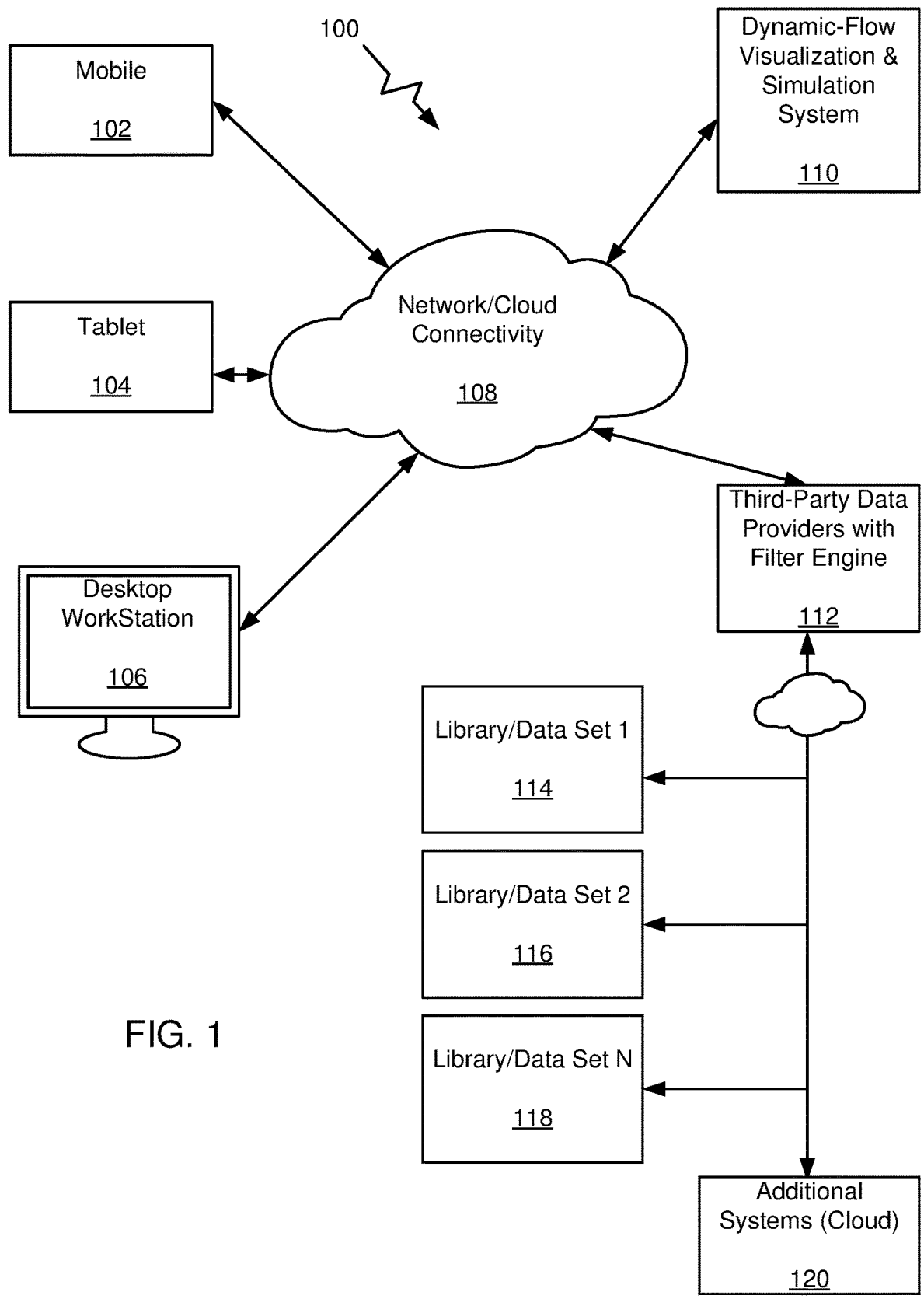
FIG. 1 is high-level block diagram illustrating an environment in which the dynamic flow visualization and simulation system [creating an artificial intelligence ("AI") approach] operates according to some embodiments of the present invention.

A dynamic flow (of fluids, air, fire, or the like) visualization and simulation system and methods are described. In the following description, for purposes of explanation, numerous specific details are set forth in order to provide a thorough understanding of the invention. The dynamic flow visualization and simulation system and methods as described here may be used in multiple industry segments, for example, insurance/reinsurance, commercial real estate, resilience planning, technical services, emergency services, consumers, and the like. The dynamic flow visualization and simulation system and methods described here is configured to provide a "catastrophe footprint" for any disaster, for example, floods, fires, hurricanes, etc.

It will be apparent, however, to one skilled in the art that the present invention may be practiced without some of these specific details. In other instances, structures and devices are shown in block diagram form in order to avoid obscuring the invention. For example, the present invention is described in one embodiment below with reference to user interfaces and particular hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, cloud-based systems, or any type of media suitable for storing electronic instructions, each coupled to a computer system bus.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, cloud-based memory systems, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, wireless modems, cable modem and Ethernet cards are just a few of the currently available types of network adapters.

Finally, the algorithms and displays presented herein are not inherently related to any particular computer or other apparatus. Various general-purpose systems may be used with special programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein.

For the purpose of clarity, orientation and differentiation, certain key terms used throughout this application are described. For example, "artificial intelligence" refers to the capacity of computers or other machines to exhibit or simulate intelligent behavior (OED), which is abbreviated throughout this description as "AI." Artificial intelligence is also described as allowing computers to learn from experience and understand the world in terms of a hierarchy of concepts, each defined through their relation to simpler concepts. The hierarchy of these concepts enables the computer to learn complicated concepts from building them out of simpler ones. Within this description, artificial intelligence covers multiple sub-domains, including machine learning, and deep learning. The term "machine learning" refers to a subset of artificial intelligence, called machine learning ("ML"), which is generally defined as a system that can extract patterns from raw data, allowing the system to gain the ability to acquire knowledge specific to the raw input data. At its core, machine learning involves limited representational learning: using subsets of raw data that distinguish ideal descriptions or conditions of interest. These subsets of ideal conditions are also denoted as features herein. It should be recognized that in general, the success of a machine learning approach depends on correlating whether the features identified within the raw data by a processing algorithm, actually are correlated to the desired outcome of the data analysis problem itself.

It should also be recognized that machine learning approaches, when applied to hydrology and hydrologic problems, are generally more successful when they are designed to limit the possible variation within the modeled system. Examples include modeling stream flow and stream discharge along a river though different flow regime. This quality may be viewed as both a strength and a weakness. For example, if the problem is well constrained (like the streamflow example) and has few factors of variation, a machine-learning approach is generally sufficient for predictive modeling. However, if the problem is complex and involves multiple factors of variation, a machine learning predictive system is likely insufficient to provide quality solutions. It should be recognized that deep learning is the artificial intelligence technique that allows the computer to build complex concepts out of simpler concepts and is more suited to address the complex problems involving multiple factors of variation. As is recognized by those skilled in the art, a simple distinction between machine learning and deep learning lies in the number of neural processing layers. Machine learning typically uses either a single or possibly several neural layers. In contrast, deep learning uses tens or hundreds of neural processing layers. The added benefit of deep learning architecture allows the present system to progressively distinguish and scale from simple to more complex features as desired.

System Overview

Referring now to FIG. 1, it illustrates example environment 100 in which the dynamic visualization and simulation system and method of the present invention operates. The environment 100 represents any networked environment with distributed systems that are connected to transmit and receive data. The environment 100 represents a cloud architecture that defines typical technology components that are combined to build a cloud, where resources are pooled through virtualization technology and shared across a network. The components of the cloud architecture include a front-end platform (the client or device used to access the cloud (e.g., mobile 102, tablet 104, or desktop 106), one or more back-end platforms (servers and storage, e.g., dynamic-flow visualization and simulation system 110) and a cloud-based delivery (e.g., network/cloud connectivity 108) methodology. A network 108 connects the cloud clients, servers, and storage. Together, these technologies create a cloud computing architecture on which the applications run to provide end-users with the ability to leverage the power of cloud resources.

The illustrated environment includes users using electronic devices, for example, the mobile device 102, the tablet 104, and the desktop 106, which may be associated with an enterprise or not. Any of these devices may communicate or interact via the network 108 with the dynamic-event visualization and simulation system 110. The environment 100 also illustrates third-party data providers with a filter engine 112 coupled to multiple data libraries. For example, a first library referenced as "Library/Data Set 1," is designated by reference numeral 114. A second "Library/Data Set 2" is designated by reference numeral 116, and a third "Library/Data Set 3" is designated by reference numeral 118. The illustrated environment 100 also describes additional systems 120 that present other sources of providing layers of data, such as data acquired from satellite systems. Typically, satellite images may be obtained from satellite sources, which provide ground truth images. As is recognized by those skilled in the art, satellite images may be used to provide accurate representation of what is occurring at every point in the world.

The network 108 is a conventional type, wired or wireless, and may have any number of configurations such as a star configuration, token ring configuration or other configurations known to those skilled in the art. Furthermore, the network 106 may comprise a local area network (LAN), a wide area network (WAN) (e.g., the Internet), and/or any other interconnected data path across which multiple devices may communicate. In yet another embodiment, the network 108 may be a peer-to-peer network. The network 108 may also be coupled to or includes portions of a telecommunications network for sending data in a variety of different communication protocols. In yet another embodiment, the network 106 includes Bluetooth communication networks or a cellular communications network for sending and receiving data such as via short messaging service (SMS), multimedia messaging service (MMS), hypertext transfer protocol (HTTP), direct data connection, WAP, email, etc. The network 108 as illustrated facilitates cloud connectivity via cloud infrastructure, which includes the hardware and software components, such as servers, storage, networking, virtualization software, services and management tools, that support the computing requirements of a cloud computing model. The cloud infrastructure also includes an abstraction layer that virtualizes and logically presents resources and services to users through application programming interfaces and API-enabled command-line or graphical interfaces.

Figure 2A:
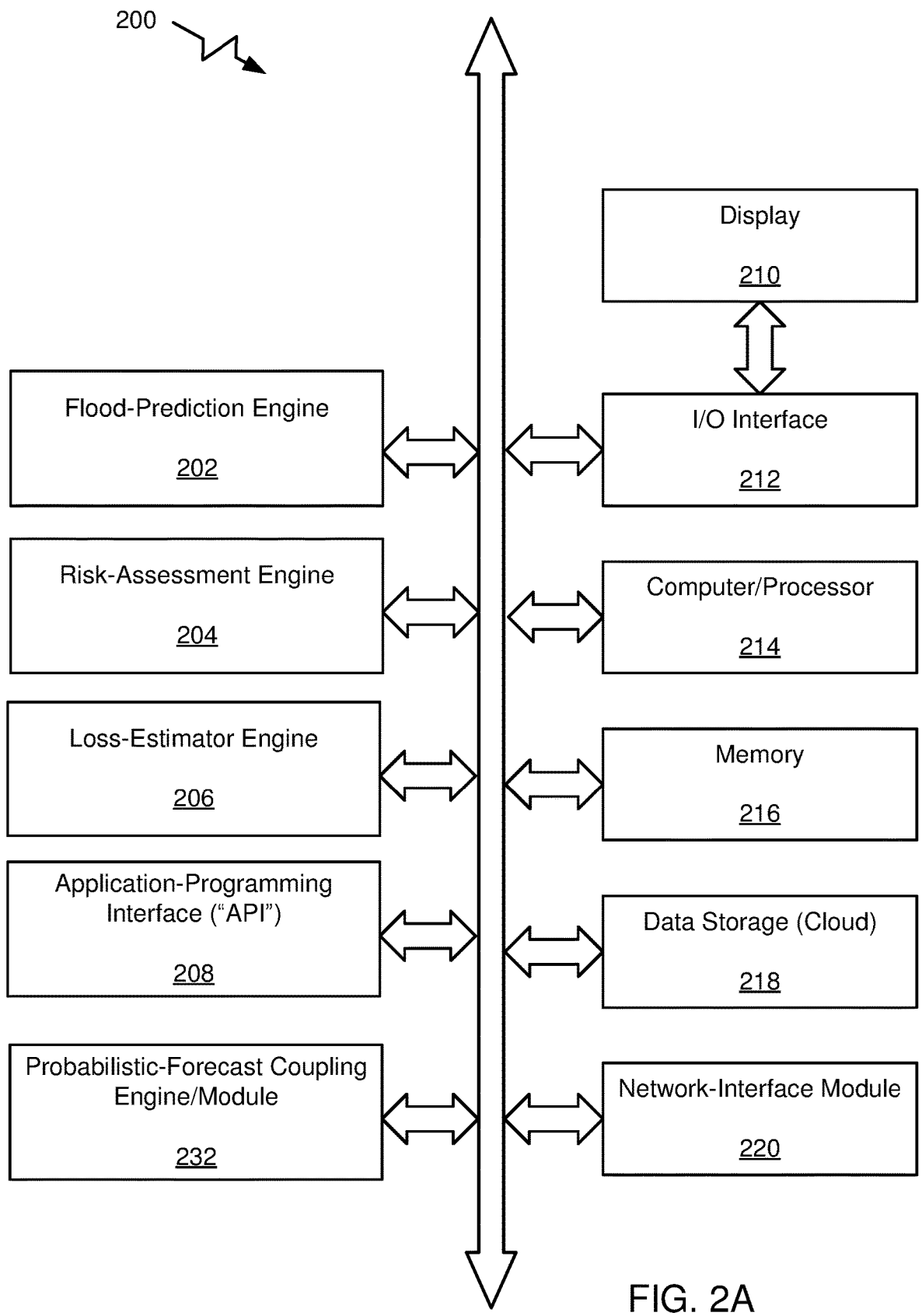
FIG. 2A is a high-level block diagram illustrating the software and hardware elements of the dynamic flow visualization and simulation system and application according to some embodiments of the present invention.

Referring now to FIG. 2A, one embodiment of the dynamic-flow visualization and simulation engine 110 is configured for simulating dynamic flow from floods. This embodiment of the system configured for simulating floods is referenced by reference numeral 200. This system 200 improves the speed with which a machine-assisted learning framework may be triggered to accelerate the prediction of 2D hydrodynamic results. It accurately predicts the physical interactions of free-flowing water across surfaces with limited input training data. The system 200 comprises a flood-prediction engine 202, a risk-assessment engine 204, a loss-estimator engine 206, and an application-programming interface ("API") 208. The system 200 further comprises a display 210, an input-output ("I/O") interface 212, a computing element such as a computer/processor 214, a memory 216, a data storage 218, and a network-interface module 220.

The flood-prediction engine 202 is configured to provide resolved flood water levels at any time during a given flood duration and rainfall intensity. The flood-prediction engine 202 is coupled by signal lines via the network (including cloud connectivity) 108 to external resources. The flood-engine 202 may be used in many ways, for example, to predict floods, to increase prediction capacity, and provide flood inundation simulation results all from a deep learning, artificial intelligence image processing system. Flooding results are output as images describing the full two-dimensional solution to the shallow water equation ("SWE") for the modeling domain, addressing parameter including, but not limited to, water depth, water velocity (both x and y directions), water discharge (both x and y directions), flow direction and flow angle, or other sampled and modeled parameters. All the parameters are addressed on a pixel-by-pixel basis for every desired time step for the duration of a flooding event. Flood modeling results are produced at a variety of spatial scales, from watershed drainage scale to the sub-building scale.

The flood-prediction engine 202 is configured to provide detailed flood impact analytics, for example, at the building-level scale. The flood-prediction engine 202 may be applied to any specific area, for example, a bounded urban area. Use of the deep learning neural net, described in greater detail below, provides rapid results iterated across a broad spectrum of flooding durations and intensities in an urban environment. The flood-prediction engine 202 simulates flooding durations from typical $85^{th}$ percentile events, to statistical return periods ranging anywhere from 1 year, 2 years, 5 years, 10 years, 20 years, 50 years etc., and catastrophic statistical return periods ranging from 100 years, 200 years, 500 years, and 1000 years, and beyond. The flood-prediction engine 202 performs theoretical "flood testing" of buildings, neighborhoods and cites to gauge vulnerabilities and strategically prioritize flood resilience infrastructure. The flood-prediction engine 202 in accordance with the present invention is configured to integrate probabilistic forecasting data to provide an ensemble view of flood risk in the near future. Forecasts of precipitation exceedance probability when linked with this flood-prediction engine 202 transform the flood inundation results produced at the building-level to the likelihood of flood risk building-by-building.

The risk-assessment engine 204 is software that is executable code configured to operate functions to assess risks associated with flooding. For example, in some embodiments, flood hazard assessments are produced across an entire spectrum of flooding magnitudes and durations and applied to assess the impacts on real property assets, such as the duration of inundation in direct contact with the real property asset, the force of the flood inundation acting on the real property asset, locations on a real property asset that experience and are vulnerable to flood inundation, as well as expected impacts to the interior of the real property assets when the flood duration, flood height, and specific location of inundation impacts are applied to the real property asset.

The loss-estimator engine 206 is software that is executable code configured to operate functions to estimate the extent of expected loss from simulation models generated. For example, in the case of a catastrophe, such as a flood or fire, catastrophe simulations are used in the (re)insurance industry to estimate expected losses from natural disasters. Catastrophe models output loss exceedance curves (LECs), i.e., a probability distribution of losses that will be sustained by an insurance company in any given year, together with an annual average loss ("AAL") and standard deviation. Given the paucity in historical losses for extreme events from which actuarial-based models are built, catastrophe models take an approach from scientific first principles to estimate the risk. The anatomy of an example catastrophe model may include a series of steps. The first task is to generate an event set representative of all possible events that may occur, along with their intensity and probability across a long-enough time period to encapsulate a comprehensive distribution of even the most extreme events. Consider an example of a 10,000-year simulation. The goal is not to recreate the last 10,000 years of events that have passed, but to simulate 10,000 years of activity equivalent to current conditions. Each event has a probability of occurrence within the simulated time period. Models may use a "boiling down" process to optimize the run-times of their models by combining very similar events together, including their probability of occurrence. This maintains the representativeness of the ultimate event set to be consistent with the original event set in terms of losses and the geographical distribution of loss, but is faster for the user to run.

For each event, a hazard footprint is generated, which calculates an appropriate hazard metric, which correlates to damage at each point in a grid across the entire area effected by an event. Use of the term event in this document includes a time-based instance in a dynamic system. Alternatively, it includes all time sequences with a dynamic system or a subset of them. For example, this may be the maximum flood depth experienced at every location during the course of the rain event. Time-stepping models are used which simulate the storm and its dynamic properties (flood depth, velocity, discharge, etc.,) at regular intervals throughout the entire lifecycle of the storm, which may be hours or days in duration. It will be recognized by those skilled in the art that topography (both natural and human-built), surface roughness, soil and geological information are all taken into account, as the model is representing the hazard at the surface of the ground. The maximum flood inundation depth experienced is stored as the "hazard footprint" provided by a catastrophe model.

In addition, vulnerability curves are generated to link the hazard metric (e.g., flood depth) to a Mean Damage Ratio ("MDR"), the proportion of the total value (e.g., in terms of replacement cost) that would be a loss for the asset being analyzed. In reality, properties exhibit a high amount of variability in their damage to the same hazard due to many unknown and un-modellable factors, even when located very close to each other. This is accounted for in an uncertainty distribution around the mean damage ratio at each hazard point, also known as "secondary uncertainty." Models that are generated often define different vulnerability zones across a region to account for different building practices or building codes.

In addition, loss-estimator engine 206 may collaborate to generate a financial module to calculate losses after taking into account the impact of insurance company policy terms and conditions to provide the net loss that the (re)insurance entity may ultimately be responsible for. The (re)insurance company may provide a list of all the policies it has underwritten with information about the location and risk characteristics, such as occupancy type, age, construction material, building height, and replacement cost of the building, as well as policy terms & conditions. The catastrophe model runs the entire event set across the portfolio, and calculates a loss from every event in the model to every policy. This produces an event loss table. These event losses are then ordered in terms of magnitude from largest to smallest to generate the Loss Exceedance Curve for the number of years the model simulates. It should be recognized by those skilled in the art that catastrophe models typically cover single peril-region combinations, e.g., a windstorm in Europe or a Japanese earthquake. In some instances, average annual losses from each peril-region combination analysis may be added together, yet typically loss exceedance curves cannot, and they must be recalculated after different peril-region analyses have been grouped together. This is because of the diversifying nature of writing risk in different, uncorrelated regions, or conversely because two portfolios have a very similar risk profile and are correlated, and therefore, the combined return-period risk may be more or less than the sum of the two.

In some embodiments, simulation models may be validated against observational data, losses, and claims data as provided by third parties. For example, if comparing model flood depths against observed flood depths, it should be recognized that flood depth observations are usually recorded at a standard height above ground level, however, the catastrophe visualization may simulate the effect of surface roughness and upstream factors such as flood protection infrastructures, storm drain locations, and other elements of the built environment in this calculation.

The probabilistic-forecast coupling engine/module 232 is software comprising executable code configured to operate functions providing a future-view of risk from output from the flood-prediction engine 202. Using output either from the loss-estimator engine 206, or third-party forecasts with precipitation exceedance probability projections, the probabilistic-forecast coupling engine/module 232 transforms the 2D hydrodynamic flood modeling results into asset-level risk probability exceedance curve data. Risk forecasts can be multi-month predictions of rainfall intensities, or near-casted hourly or weekly predictions of likely precipitation levels.

The application-programming interface 208 interconnects the four applications—flood-prediction engine 202, risk-assessment 204, loss-estimator engine 206, and probabilistic-forecast coupling module 232. The application-programming interface 208 serves as a middle layer in the system architecture, facilitating programmatic interactions between the various modules in every instance.

The computer or processor 214 comprises an arithmetic logic unit, a microprocessor, a general-purpose controller or some other processor array configured to perform programmed computations and provide electronic display signals to the display 210. The computer or processor 214 is coupled to the bus for communication with the other components. Processor 214 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors are used. It will be obvious to one skilled in the art that other processors, operating systems, sensors, displays and physical configurations are possible.

The memory 216 stores instructions and/or data that may be executed by the computer or processor 214. The memory 216 is coupled to the bus for communication with the other components. The instructions and/or data may comprise code for performing any and/or all of the techniques described herein. The memory 216 may be a dynamic random-access memory (DRAM) device, a static random-access memory (SRAM) device, flash memory or some other memory device known in the art.

In one embodiment, data storage 218 stores data, information and instructions used by the flood-prediction engine 202, the risk-assessment engine 204, the loss-estimator engine 206, the probabilistic-forecast engine/module 232, and the application-programming interface 208. Data storage 218 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. Cloud storage may be computer data storage in which the digital data is stored in logical pools, said to be on "the cloud." The physical storage spans multiple servers (sometimes in multiple locations), and the physical environment may be owned and managed by a hosting company.

The data storage 218 is coupled by the bus for communication with other components of the system 200. The input-output ("I/O") interface 212 connects to other components for reporting and/or visualization of selected results as desired.

The network-interface module 220 is coupled to network 108 by the bus. The network-interface module 220 includes ports for wired connectivity such as but not limited to USB, SD, or CAT-5, etc. The network-interface module 220 links the processor 214 to the network 108 that may in turn be coupled to other processing systems. The network 108 may comprise a local area network (LAN), a wide area network (WAN) (e.g., the Internet), and/or any other interconnected data path across which multiple devices may communicate. The network-interface module 220 provides other conventional connections to the networked desktop workstation 106 using standard network protocols such as TCP/IP, HTTP, HTTPS and SMTP as will be understood to those skilled in the art. In other embodiments, the network-interface module 220 includes a transceiver for sending and receiving signals using WIFI, Bluetooth® or cellular communications for wireless communication.

In some embodiments, the flood-prediction engine 202 may be configured as an "on-demand" program, application or tool that consumers, whether individuals or enterprise may access by a subscription or other arrangement. The flood-prediction engine 202 is implemented within a cloud infrastructure and configured to easily provide its design and artificial intelligent system as an analysis-as-a-service ("AaaS") application, a software-as-a-service ("SaaS") application or tools from a platform-as-a-service ("PaaS") or serve as a service or a part of an integration platform ("IPaaS") to be flexible and scalable enough to handle any environment or use case.

Figure 2B:
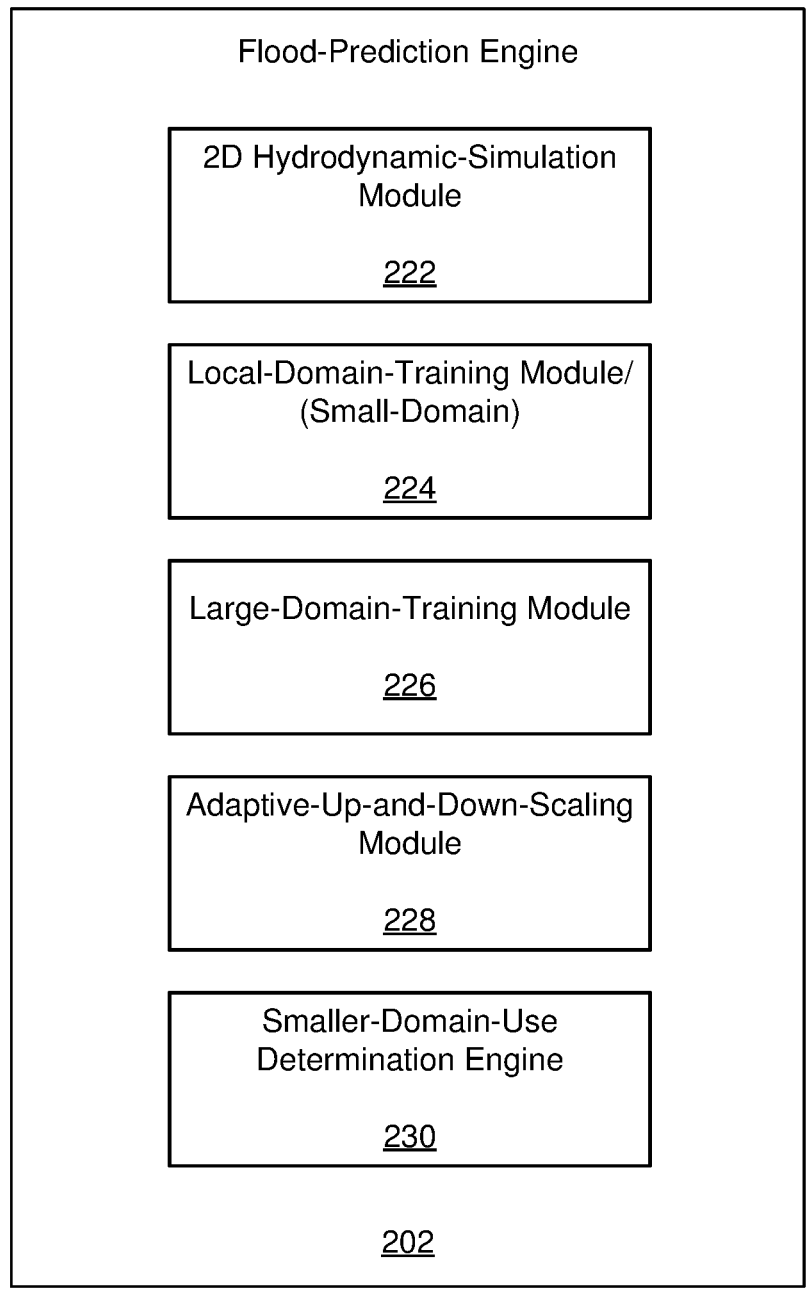
FIG. 2B is a high-level block diagram illustrating a flood prediction engine according to one embodiment of the present invention.

Referring now to FIG. 2B, the flood-prediction engine 202 comprises a 2D hydrodynamic-simulation module 222, a local-domain-training module (small domain) 224, a large-domain-training module 226, an adaptive-up-and-down-scaling module 228, and a smaller-domain-use determination engine 230, each coupled to communicate and provide input and output data to each other. The flood-prediction engine 202 provides rapid and accurate flood predictions for a large or small specific urban areas in one example, by using an artificial intelligence, deep learning approach via its training modules. In some embodiments, the flood-prediction engine 202 is designed using a deep-learning neural network to generate predictions of overland surface water flow for a given urban environment, at both large and local domains, across the full range of rainstorm intensities and durations. For example, the flood-prediction engine 202 uses a trained deep neural network (described in more detail later) to accurately predict the 2D surface hydrodynamics for large modeling domains of an area between 10-200 mile^2 at a resolution of at least 100 square feet per pixel (large-domain-training module 226), as well as local and small modeling domains with an area between 0.0001-10 mile^2 at a resolution of at least 2.5 square feet per pixel.

Figure 2C:
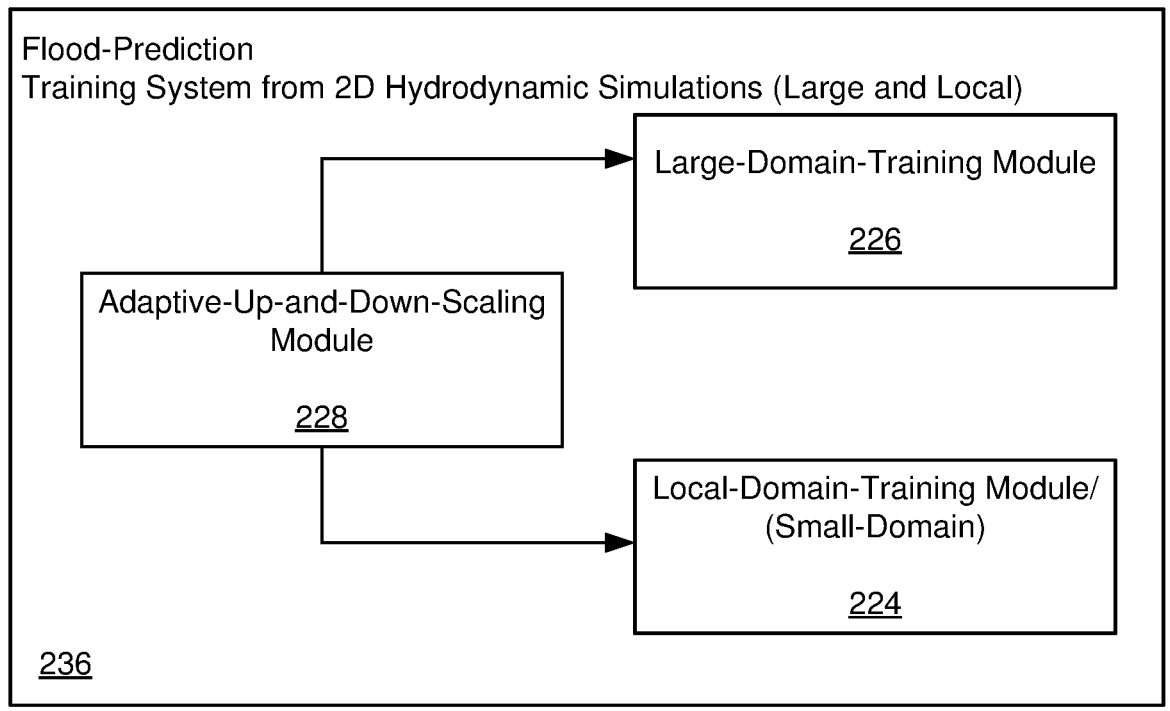
FIG. 2C is a block diagram illustrating the flood prediction training system and the flood prediction engine in accordance with some embodiments of the present invention.
Figure 2C:
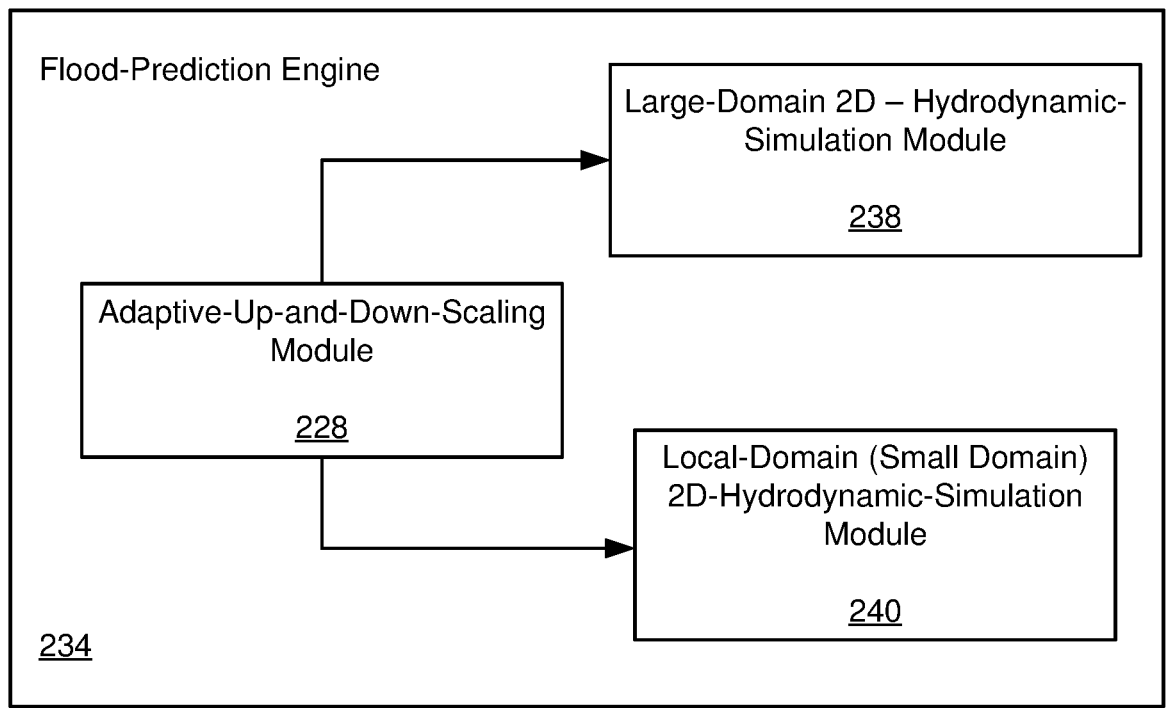

Referring also to FIG. 2C, the flood-prediction training module from 2D hydrodynamic simulations (large and local) 236 comprises an adaptive-up-and-down-scaling module 228 coupled to the large-domain-training module 226, and the local-domain-training module/(small domain) 224. The adaptive-up-and-down-scaling module 228 provides downscaled data from the large modeling domain, resolved to at least 100 square feet per pixel, into resolutions of at least 2.5 square feet per pixel, for assessing at the real asset level, the particular impacts of flooding due to its increased resolution. Conversely, the adaptive-up-and-down-scaling module 228 provides higher resolution data, resolved to at least 2.5 square feet per pixel from the local modeling domain, and upscales the data, across a larger domain with a lower resolution of at least 100 square feet per pixel. The flood-prediction training system 236 is trained for both medium resolution (100 square feet per pixel) and high resolution (2.5 square feet per pixel) 2D hydrodynamic modeling data. The flood-prediction engine 234 comprises an adaptive-up-and-down scaling module 228, a large-domain-2D hydrodynamic simulation module 238, and a local-domain-2D hydrodynamic simulation module (small domain) 240. The flood-prediction engine 234, simulates 2D hydrodynamic results across both large and local domains. Each of the modules depicted are software with executable code for executing functions described in the flow charts below.

Figure 3:
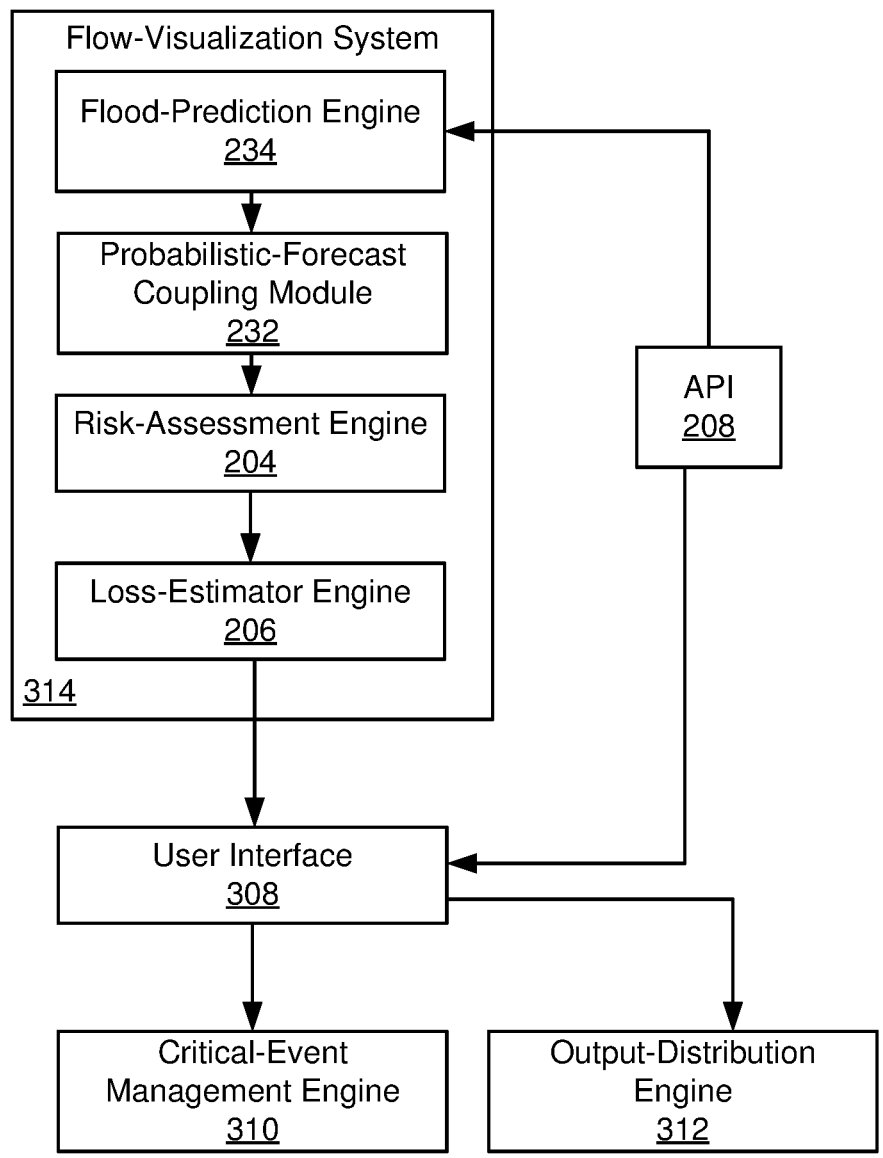
FIG. 3 is a block diagram illustrating the dynamic flow visualization and simulation system according to one embodiment of the present invention.

Referring now to FIG. 3, in some embodiments, a flow-visualization system 314 may be configured to include the flood-prediction engine 234, the probabilistic-forecast coupling engine/module 232, the risk-assessment engine 204, and the loss-estimator engine 206. As illustrated, the flow-visualization system 314 is coupled to a user interface 308 by the application-programming interface ("API") 208. In some embodiments, the user interface 308 is coupled to a critical-event management engine 310 to provides data to critical infrastructure in the event of peril from natural or other disasters and the output-distribution engine 312, which may provide reports as desired to subscribing or other entities and consumers.

Figure 4:
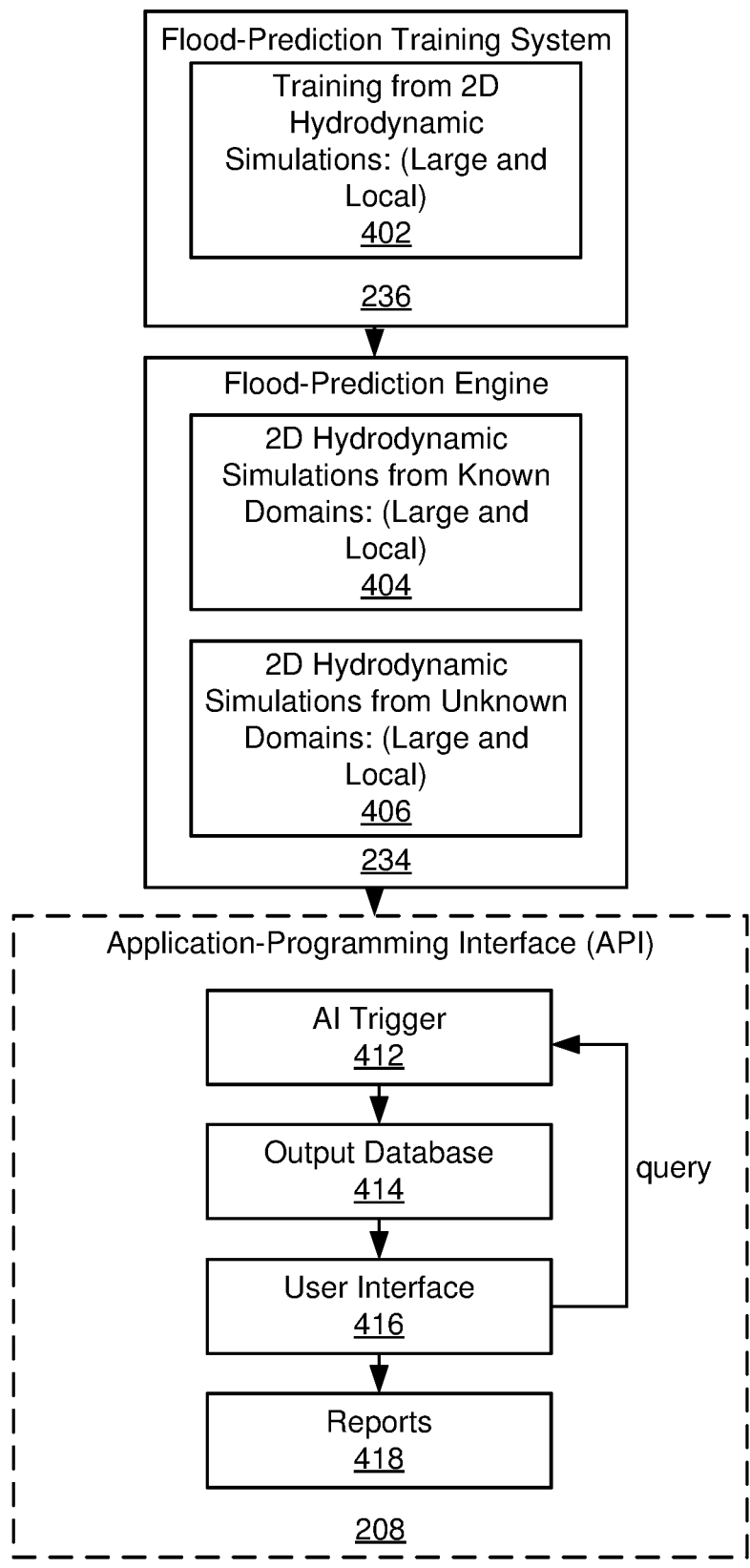
FIG. 4 is a block diagram illustrating a flood prediction training system in communication with the prediction engine in communication with an application programming interface in accordance with some embodiments of the present invention.

Referring now to FIG. 4, some embodiments of the present invention may comprise the flood-prediction training system 236 with programmed functions 402 for training from 2D hydrodynamic simulations (from large and local domains). The flood-prediction engine 234 is also configured to perform functions 404 for creating 2D hydrodynamic simulations from known domains (large and local) from known domains and functions 406 for 2D hydrodynamic simulations from unknown domains: (large and local). The application-programming interface ("API") 208 in some embodiments may be programmed with an AI trigger 412 that is transmitted to an output database 414, a user interface 416, and a reports module 418 to generate reports. The user interface 416 may be programmed to query the AI trigger 412. For example, the AI trigger 412 includes input criteria, such as user-captured input. By way of example, in FIG. 6C, various input types are described (e.g., block 620). Alternatively, the AI trigger 412 may be automatically triggered by queries from network cloud connectivity 108. The AI trigger may be automatically triggered by receiving an image, audio, video or any signal, received via the cloud from a user's device, whether a mobile or workstation etc., or receiving another signal form another network. In some embodiments, the AI trigger 412 is configured to receive an alert signal from existing security systems or other modeling software system, and/or near-casting weather stations, weather prediction systems or the like.

Figure 5:
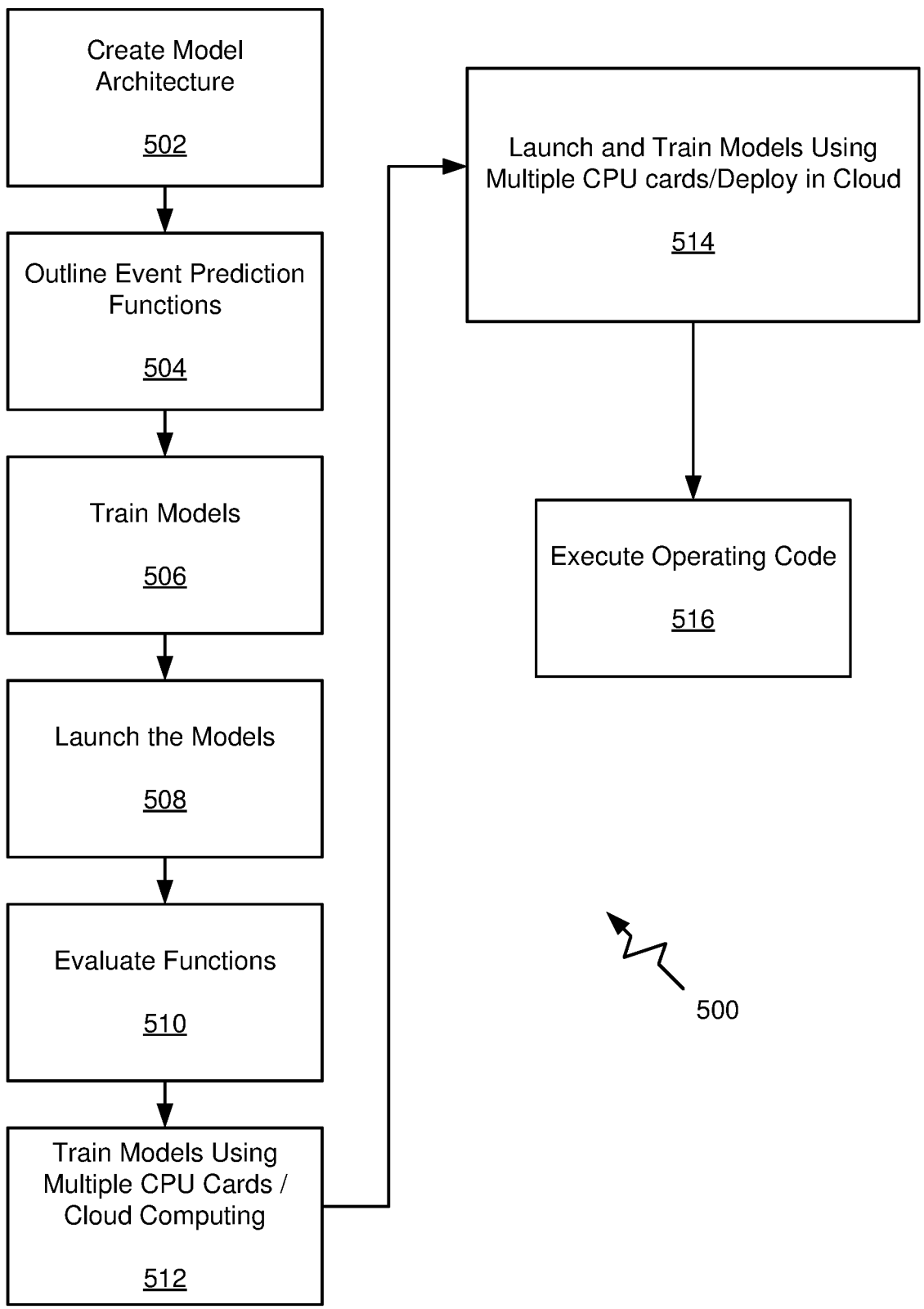
FIG. 5 is a flowchart illustrating a general method for creating a model architecture and training modules for dynamic flow visualization and simulation in accordance with one embodiment of the present invention.

FIG. 5 illustrates an example flow chart of operations to create and train models. For example, the process flow 500 begins at block 502, including one or more operations for creating a model architecture. The process flow 500 proceeds to the next block 504, including one or more operations for outlining event prediction functions. The process flow 500 proceeds to the next block 506, including one or more operations for training the models. The process flow 500 proceeds to the next block 508, including one or more operations for launching the models. From there, the process flow 500 continues to the next block 510, including one or more operations for evaluating the functions. The process flow 500 proceeds to the next block 512, including one or more operations for training the models using cloud computing. The process flow 500 proceeds to the next block 514, including one or more operations for launching and training models and deploying them in the cloud. The process flow 500 proceeds to block 516, including one or more operations for executing the operating code to render the models functional for use in creating simulations.

Figure 6A:
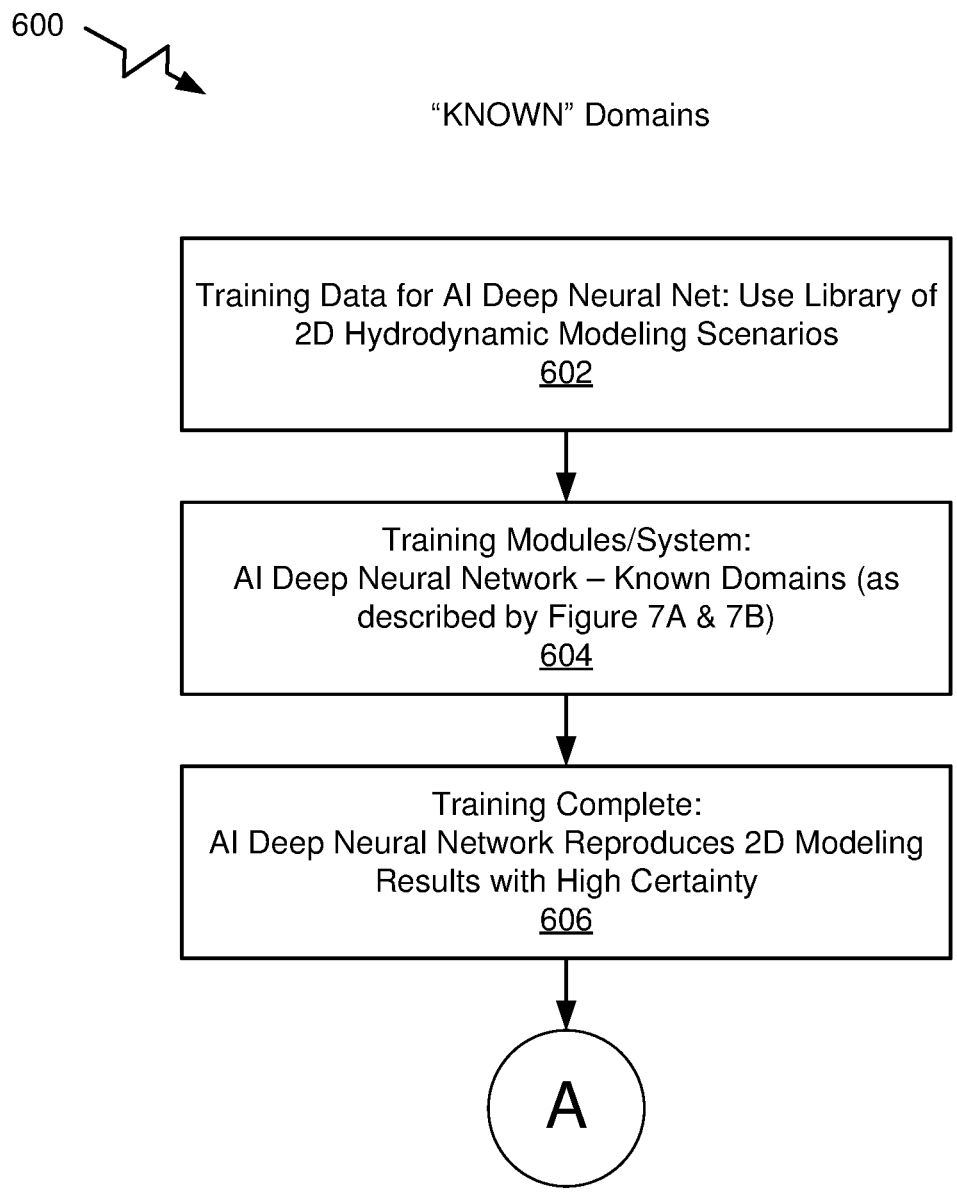
FIG. 6A is a flowchart illustrating a specific example method for creating and training deep neural networks for a "known" domain according to one embodiment of the present invention.

FIG. 6A illustrates the flow chart for training data for known domains. The process flow 600 for training data for known domains begins at step 602, including one or more operations for "Training Data for AI deep neural net," which uses a library of 2D hydrodynamic modeling scenarios. The flow proceeds to the next step 604, involving the Training Module/System (e.g., 236 (FIG. 2C), 402 (FIG. 4), 604 (FIG. 6A), 610 (FIG. 6B), FIGS. 7A & 7B)), which by the AI deep neural network trains on "known" domains (as described by FIGS. 7A & 7B). The process flows to the next step 606, including one or more operations for completing the training, including using the AI deep neural network to reproduce 2D modeling results on "known" domains with high certainty. The flow proceeds to the next step in FIG. 6C via connector "A."

Figure 6B:
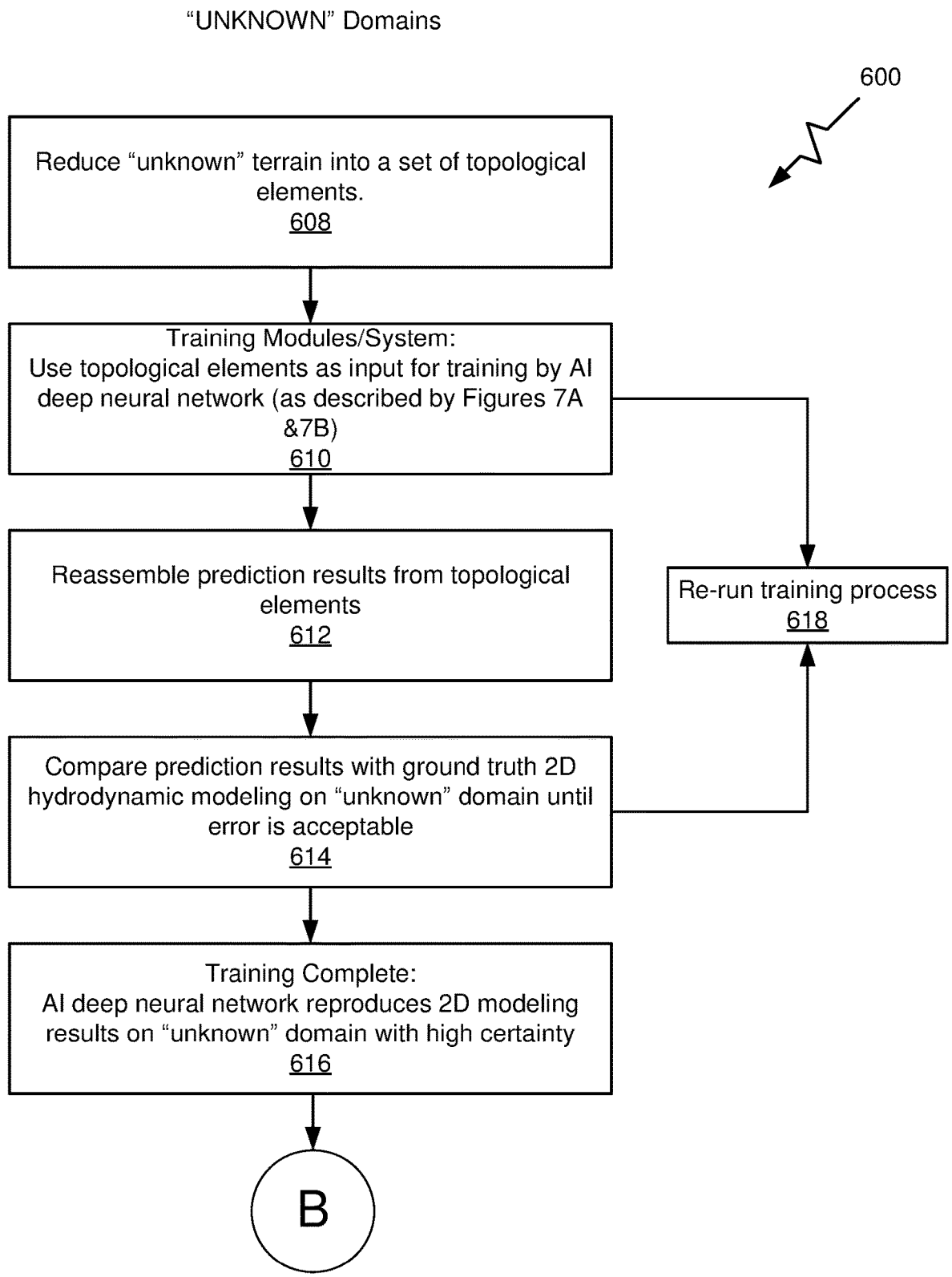
FIG. 6B is a flowchart illustrating a specific example method for creating prediction and ground truth models for "unknown" domains according to one embodiment of the present invention.

In some embodiments and scenarios described here as examples, and as illustrated in FIG. 6B, the present system executes artificial intelligence flood modeling for unbounded areas. The models may be developed either simultaneously, or on a staggered timeline. Using a bounded approach, the flood-prediction engine provides rapid and accurate flood predictions for topographies not been implicitly trained on. The flood-prediction engine creates a flood model for a bounded area. The flood-prediction engine provides rapid and accurate flood predictions for a large (and specific, i.e., "bounded") as well as unbounded urban areas using a deep learning approach.

FIG. 6B illustrates the overview flow chart describing the steps for training data for "unknown" domains and is illustrated in more detail by FIGS. 9A-9E. The process flow 600 begins with step 608, representing one or more operations for reducing an "unknown" terrain into a set of topological elements. The process 600 proceeds to the next step 610, including one or more operations with the training module, including using topological elements as input for training by AI deep neural network (as described by FIGS. 7A and 7B). The process 600 proceeds to the next step 612, including one or more operations for reassembling prediction results from the topological elements. The process 600 flows to the next step 614, including one or more operations for comparing prediction results with ground truth 2D hydrodynamic modeling on "unknown" domains until error is acceptable. If error rate persists, the process flow 600 proceeds to the next step 618, including one or more operations for re-running the training process. The process 600 flows to the next step 616, including one or more operations for completing the training, including using the AI deep neural network to reproduce 2D modeling results on "unknown" domains with high certainty. The process 600 proceeds via connector "B" to FIG. 6C.

In FIG. 6A, block 602 describes the process 600 by which training data is generated from "traditional" 2D hydrodynamic modeling using highly resolved unstructured computational meshes. The computational mesh dimensions are dependent on their bounding area: for large modeling domains of an area between 10-200 miles ^2, at a resolution of at least 100 square feet per mesh cell is used; for local and small modeling domains with an area between 0.0001-10 miles^2 at a resolution of at least 2.5 square feet per mesh cell is used. This level of resolution provides significant insight into the subtle behavior of the urban fabric's flow regime identifying topographic features such as gutters, curb cuts, driveways, street crowns, etc.

In FIG. 6A, block 602 includes further parameters for generating 2D hydrodynamic training data. It includes, but is not limited to, the following: geographic domains, rainstorm intensities and rainstorm durations. Rainstorm intensities can be accommodated in either probable maximum precipitation frequencies (1-yr return period, 100 yr, return period, etc.) or accumulated depth of rainfall per unit time. All rainstorm intensity and duration information are correlated to the specific geographical location, within the local or large domains. The following list shows examples, but is not limited to, rainstorm intensities (depth per unit time) and durational (time) periods used to create the 2D hydrodynamic training data:

Rainstorm Intensities:
    85th percentile event;
    1 yr return period;
    2 yr return period;
    5 yr return period;
    10 yr return period;
    25 yr return period;
    50 yr return period;
    100 yr return period;
    200 yr return period;
    500 yr return period;
    1000 yr return period;
    . . .

Alternatively, rainstorm intensities may be represented as accumulated rainfall depth per unit time, in either metric or Imperial units:

Rainstorm Intensities:
  1 cm/hour;
  2 cm/hour;
  10 cm/hour
  15 cm/hour;
  20 cm/hour;
  35 cm/hour;
  50 cm/hour;
  75 cm/hour;
  100 cm/hour;
  . . .

Rainstorm Durations:
  5-min;
  15-min;
  30-min;
  1-hour;
  2-hour;
  6-hour;
  12-hour;
  24-hour;
  48-hour;
  72-hour;
  96-hour.

In FIG. 6A, blocks 602 and 604 describe training datasets, which are converted from vector-based 2D hydrodynamic outputs using executable code into an image-based format. The process 600 continues in the training modules, FIG. 6A, block 604 (also referenced in FIG. 2C, as blocks 226 and 224). Each training dataset consists of a series of multi-dimensional input images, with each image illustrated as a separate channel; multiple images are combined into a single multi-dimensional input image. The image type may be any industry-standard image format (TIFF, JPEG, and others), provided the data, described within each raster cell is in a floating decimal point format.

In FIG. 6A, block 602 describes the composition of the training datasets. The training datasets are comprised of, but not limited to, the following elements, with each element represented as a single-band image of width ("w") in pixels and height ("h") in pixels, and each image comprising a specific time step within the modeled storm duration. The single band images are combined, with executable code, to form a multi-dimensional ("many channel") image of width ("w") pixels, and height ("h") pixels. The multi-dimensional images bands are comprised of, but not limited to, the following training attributes:
  Band 1: Input topography (meters);
  Band 2: Flood inundation water depth at time T* (meters);
  Band 3: U-water velocity, (m/sec) [x-axis component] at time T*;
  Band 4: V-water velocity, (m/sec) [y-axis component] at time T*;
  Band 5: Cumulative Rainfall at time T*;
  Band 6: P-water flux [discharge](m3/sec/m) [x-axis component] at time T*;
  Band 7: Q-water flux [discharge](m3/sec/m) [y-axis component] at time T*;
  Band 8: Water velocity (m/sec) [scalar] at time T*;
  Band 9: Water flow direction (radians) at time T*;
  Band 10: Storm drain locations within input topography;
  Band 11: Built Environment Feature (1) within input topography;
  Band 12: Built Environment Feature (2) within input topography;
  Band 13: Built Environment Feature (F) within input topography;
  . . .
  Band N.

All multi-dimensional training images are mapped to share identical attributes by channel with uniform units of measurement throughout all libraries, in either metric or Imperial units.

In FIG. 6A, block 602 describes the training datasets, which in some configurations, may consist of time-dependent remote sensed imagery, satellite imagery, or other remote sensed imagery data that describe the dynamic interaction of wind, fire, flood, etc. over time.

Figure 6C:
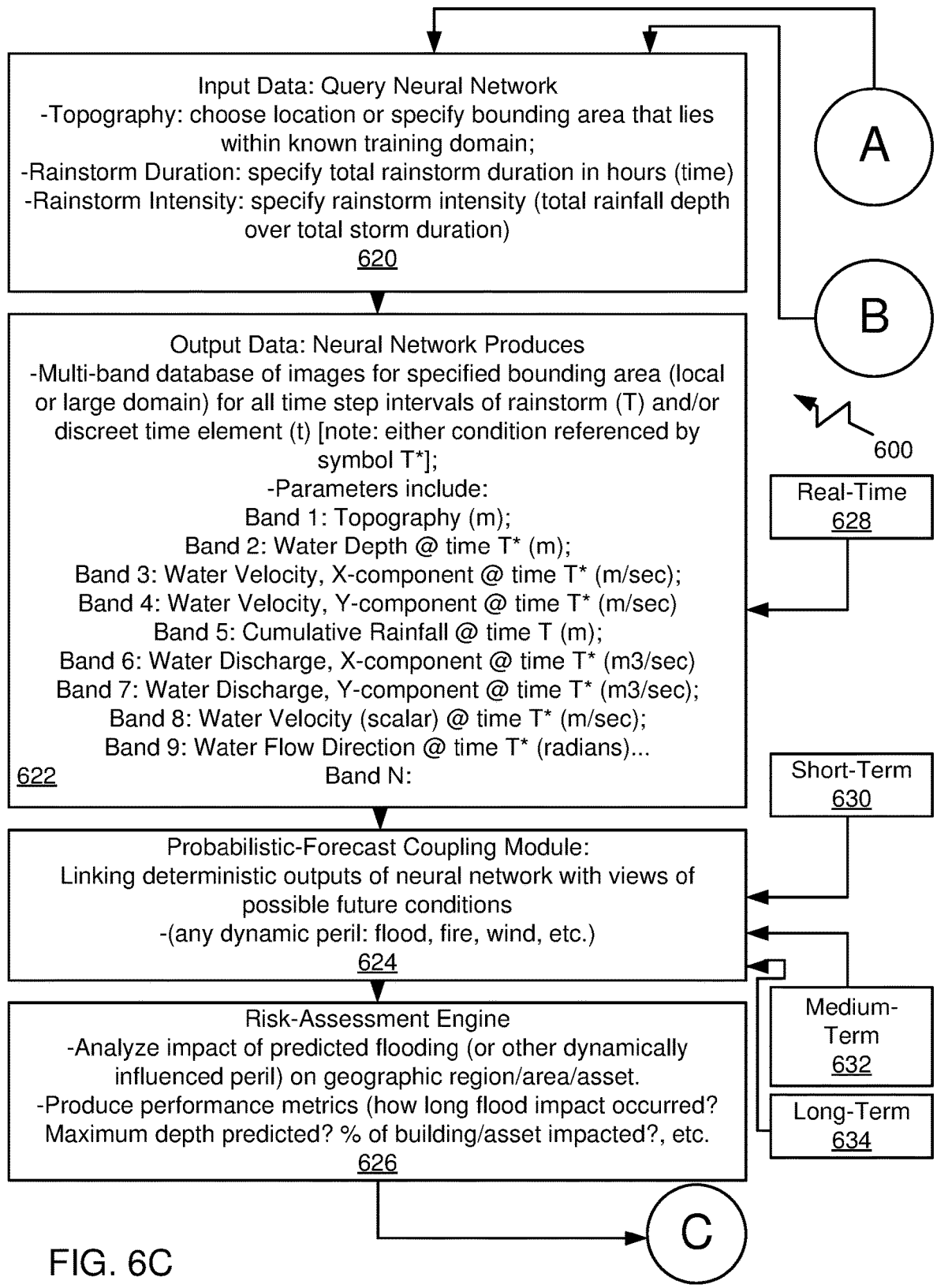
FIG. 6C is a flowchart illustrating an example method by which the simulation system operates according to some embodiments of the present invention.

FIG. 6C continues the process 600 from FIGS. 6A and 6B. As illustrated in FIG. 6C, system blocks 620 and 622, via connectors "A" and "B", include one or more operations for providing input data, by presenting a query to the neural network that is created. The queries may relate to the topography, for example queries to choose location or specify bounding area that lies within "known" training domains. As another example, input data may relate to the rainstorm duration, either the full storm duration or a discrete partial duration. For example, the users may specify the total rainstorm duration in hours ("time"), or a specific ("discrete") moment during the rainstorm duration ("time"). As another example, input data may relate to the total rainstorm intensity to be simulated. Rainfall intensity is defined as total rainfall depth over total storm duration, or per unit time.

Central to the present invention, and as illustrated in FIG. 6C, system blocks 620 and 622 comprise a portion of the "on-demand" flood prediction engine. The flood prediction engine is created from deep-learning neural networks using the training module in FIG. 6A, block 604. The training is complete once the neural net reproduces with acceptable error 2D hydrodynamic overland surface water flows within a given urban environment across a broad range of rainstorm intensities and durations, as per FIG. 6A, block 606. The "on-demand" deep learning neural network is queried by the inputs from connectors "A" and "B."

In FIG. 6C, system block 620 describes a querying process. The input image or multi-dimensional input images fed into the created deep neural network are comprised of [at least] the following:
  Single-dimensional Input Image for Query of Deep-Learning Neural Network:
    Band 1: Input topography. A single channel image of width (w) pixels by height (h) in pixels. The input resolution of the topography is at least 100 square feet per pixel for domains with an area between 10-200 miles^2, or at least 2.5 square feet per pixel for domains with an area between 0.0001-10 miles^2;
  Additional input parameters for specifying the initial conditions for the flood simulation:
    Parameter 1: Total rainstorm duration (time);
    Parameter 2: Rainstorm intensity (depth/unit time);
    Parameter 3: Urban storm drain performance (on, off, or percentage performance);

The multi-dimensional input images fed into the created deep neural network are comprised of [at least] the following:
  Multi-dimensional Input Image for Query of Deep-Learning Neural Network:
    Band 1: Input topography. A single channel image of width (w) pixels by height (h) pixels. The input resolution of the topography is at least 100 square feet per pixel for domains with an area between 10-200 mile^2, or at least 2.5 square feet per pixel for domains with an area between 0.0001-10 mile^2;

Band 2: A single channel image of width (w) pixels by height (h) pixels whose value indicate the total rainstorm duration (time);

Band 3: A single channel image of width (w) pixels by height (h) pixels whose value indicate the rainstorm intensity (depth/unit time);

Band 4: A single channel image of width (w) pixels by height (h) pixels whose value indicates the urban storm drain performance (on, off, or percentage performance);

. . .

Band N: A single channel image of width (w) pixels by height (h) pixels whose value indicates an additional modeled parameter.

The output created by the neural network shown in block 622 may be configured as a multi-band database of images for the specified input bounding area (local or large domain). The output images describe the flood predictions at any discrete time (t) within the duration of a specified rainstorm event. Alternatively, the created neural network 622 may be configured to produce a database of multiple output images describing the complete dynamic progression of the entire flood duration (T). Either duration condition (discrete or complete) is referenced by the symbol (T*)

The output created by the neural network 622 may be configured as a multi-dimensional (or multi-band) database of images. Each multi-dimensional image is of width (w) in pixels and height (h) in pixels, with each single-channel band describing the predicted state of either a hydrodynamic parameter, topographic parameter, or modeling parameter at a specific time step (T*) within the total storm duration. The output multi-dimensional images bands are comprised of, but not limited to, the following:

Band 1: Input topography (meters);
Band 2: Flood inundation water depth at time T* (meters);
Band 3: U-water velocity, (m/sec) [x-axis component] at time T*;
Band 4: V-water velocity, (m/sec) [y-axis component] at time T*;
Band 5: Cumulative Rainfall at time T*;
Band 6: P-water flux [discharge](m3/sec/m) [x-axis component] at time T*;
Band 7: Q-water flux [discharge](m3/sec/m) [y-axis component] at time T*;
Band 8: Water velocity (m/sec) [scalar] at time T*;
Band 9: Water flow direction (radians) at time T*;
Band 10: Storm drain locations within input topography;
Band 11: Built Environment Feature (1) within output topography;
Band 12: Built Environment Feature (2) within output topography;
Band 13: Built Environment Feature (F) within output topography;
Band N.

Figure 6D:
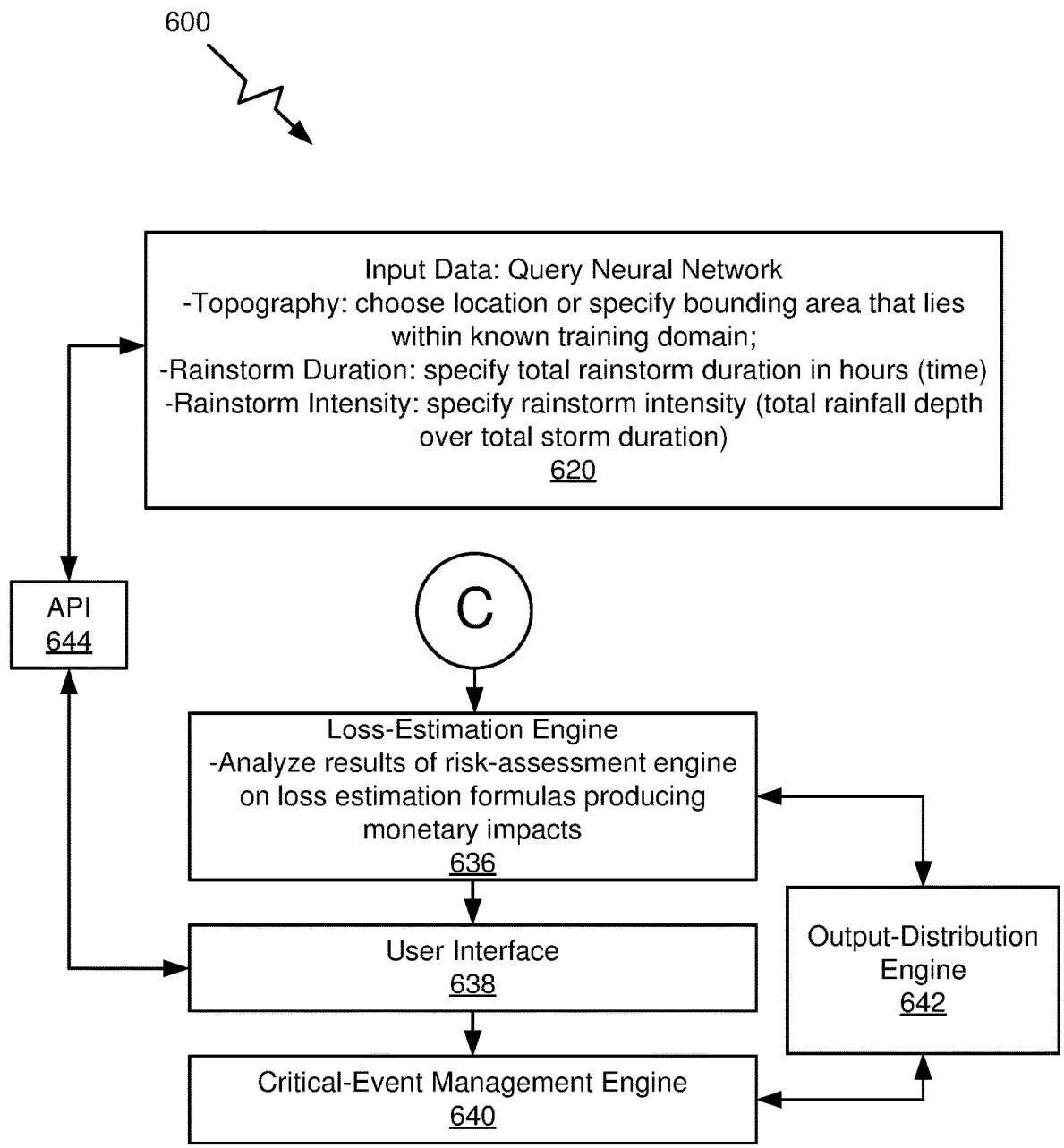
FIG. 6D is a continuation of the flowchart in FIG. 6C.

The process continues to the next block 624, including one or more operations performed by the probabilistic forecast coupling module for linking deterministic outputs of the neural network with views of possible future conditions (any dynamic peril, such as flood, fire, wind etc.). The process flow continues to the next block of operations performed by the risk-assessment engine 626, including one or more operations for analyzing impact of predicted flooding (or other dynamically influenced peril) on geographic region/area/asset. Another operation is producing performance metrics, for example, how long the flood impact lasts or the maximum depth predicted, or the percentage of buildings/assets impacted. Additional queries may be presented. Blocks 628, 630, 632, and 634 represent real-time, short-term, medium-term, and long-term inputs provided through the process flow. The process flow proceeds from block 626 to the next block 636 of operations in FIG. 6D. Block 636 represents one or more operations performed by the loss-estimation engine, including analyzing results of the risk-assessment engine or loss estimation formulas producing monetary impacts. The process flow proceeds to the next block 638 to represent operations performed by the user interface. The process flow proceeds to the next block 640, including one or more operations performed by the critical-event management engine. The block of operations in block 640 are linked by the output-distribution engine 642 to the block of operations 636 performed by the loss estimation engine. As illustrated, the application programming interface 644 links the user interface 638 to block 620 representing the input data querying the neural network.

The flood engine overcomes the technical obstacles of existing technologies, by its novel artificial intelligence ("AI") deep learning approach configured to dramatically improve the overall solution speed for fluid flow problems. The AI-powered flood engine enables "on-demand" querying of the deep neural network to provide full 2D hydrodynamic modeling results for the input domain, while generating low error. The flood engine by its machine-assisted learning framework accelerates the prediction of 2D hydrodynamic results, provides significant time and resource savings, as compared with "traditional" high resolution 2D hydrodynamic modeling. The flood engine architecture uses training by a deep neural network to accurately predict the physical interactions of free-flowing water across urban surfaces from a limited input of training data. By way of example, the flood engine's high-level modeling framework is described above. However, it should be recognized that this model is provided for context and may be adapted by those skilled in the art for similar uses.

Additionally, by generating the full 2D hydrodynamic flow results, the flood engine can be trained to identify where floodwater-or-stormwater infiltration locations are most suitable, calculate the embedded potential carbon costs/savings for each sub-catchment volume of infiltrated stormwater, and provide a range of economic costs and benefits tied to the green, or gray-green infrastructure treatment strategy specific to each sub-catchment.

Figure 7A:
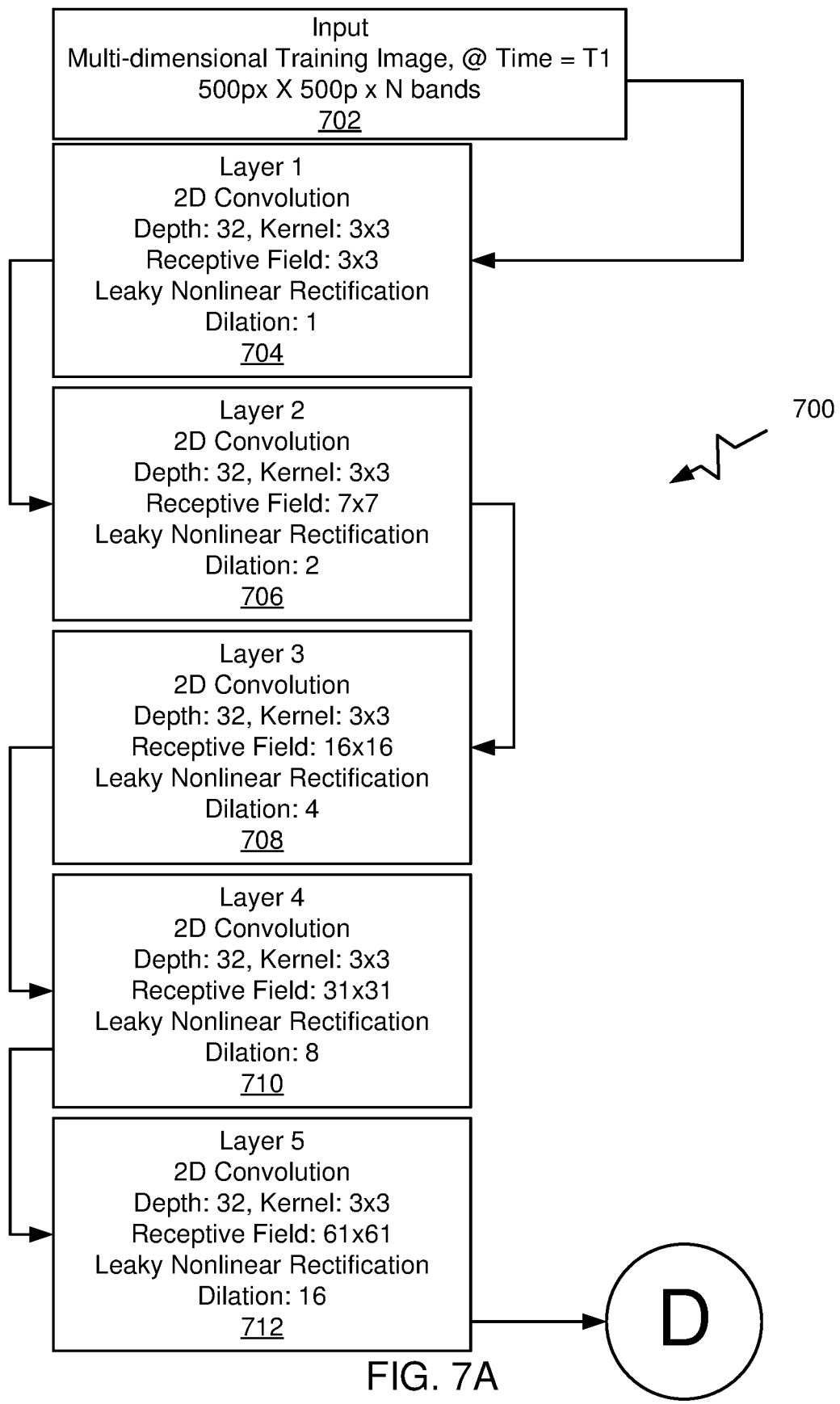
FIG. 7A is an example architecture of the example deep neural network created according to some embodiments of the present invention.
Figure 7B:
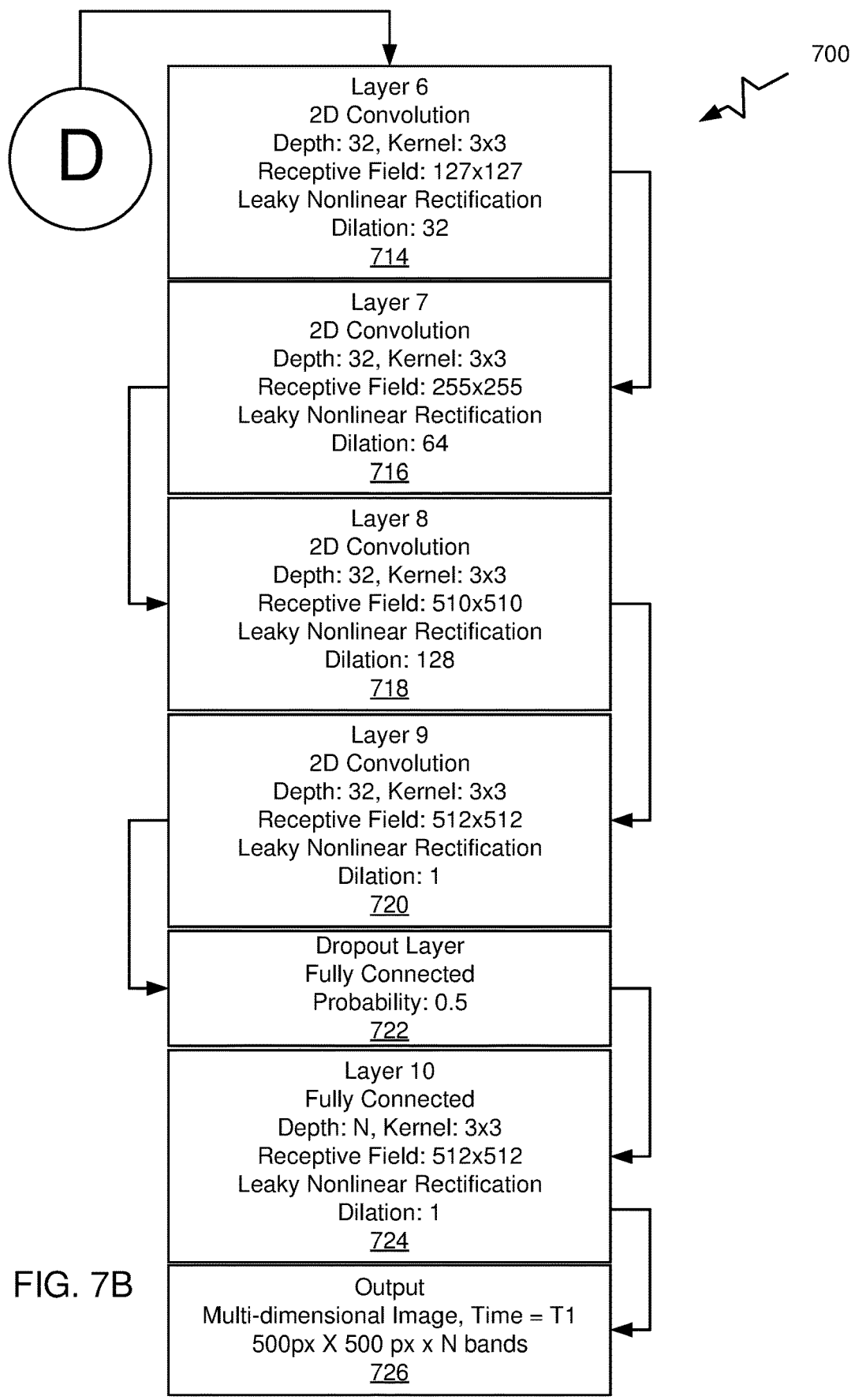
FIG. 7B is a continuation of the flow chart in FIG. 7A.

Referring now to FIGS. 7A and 7B, together they illustrate the architecture of an example deep neural network created and used according to some embodiments of the present invention. The architecture is designated generally by reference numeral 700. The flood-prediction engine uses a fully convolutional neural net with at least 11 layers computed within a deep learning program. The first nine layers are 2D dilated convolutions with a leaky rectified linear activation function, 3×3 sized kernels, and stride=1. Dilation is used to allow input pixels that are far away from output pixels to have an influence within training. The idea is that far-away topographic regions can indeed influence flooding (or other hydrodynamic parameters) at each pixel. The dilation rate is doubled for the first 8 layers. A leaky rectified linear activation function works to inhibit "dead neurons" during the recursive data training procedure. A dropout layer is used to prevent overfitting and aid with generalization. Finally, the last layer is used to create the N channels of the output image, where N is the number of time step output images the network predicts in a single pass. The last layer is equivalent to a fully-connected layer by using 1×1 convolution kernels. The network width and depth start small and grows until the validation set provides fits that are sufficient to meet the desired confidence level. Every convolutional layer uses batch normalization to expedite training. Adam optimization is used as a state-of-the-art training algorithm to simplify learning rate determination and expedite training.

Figure 10:
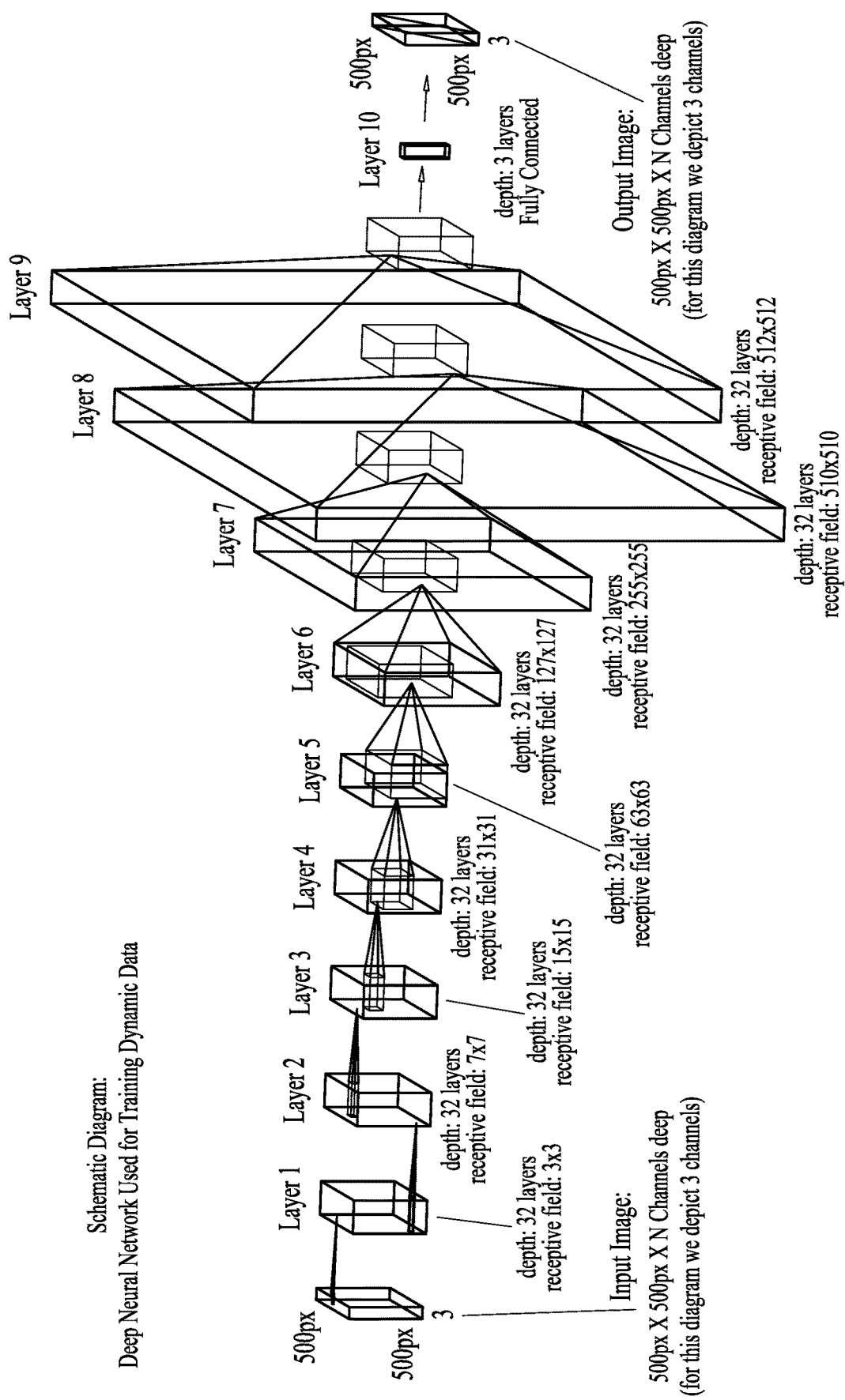
FIG. 10 illustrates a system architecture representation of a deep neural network used for training dynamic data (similar to FIGS. 7A & 7B).

In FIG. 7A, the deep net system architecture designated generally by reference numeral 700 illustrates an input 702 of multi-dimensional training images at a designated time (time=T1), using 500 pixels×500 pixels×N bands (any designated number). The input flows to Layer 1 704 of 2D convolution with a depth of 32 layers and a kernel of 3×3 and a receptive field of 3×3, and a leaky nonlinear Rectification Dilation of 1. As recognized by those skilled in the art of machine learning, the terms described herein "kernel", "layer", "2D convolution, "receptive field", "dilation" etc. are specifically known. Layer 2 706 in the architecture 700 is of 2D convolution with a depth of 32 layers and kernel of 3×3 and receptive field of 7×7, and a leaky nonlinear Rectification Dilation of 2. Layer 3 designated by reference numeral 708 in the architecture 700 is of 2D convolution with a depth of 32 layers and kernel of 3×3 and receptive filed of 16×16, and a leaky nonlinear Rectification Dilation of 4. Layer 4 designated by reference numeral 710 in the architecture 700 is of 2D convolution with a depth of 32 layers and kernel of 3×3 and receptive field of 31×31, and a leaky nonlinear Rectification Dilation of 8. Layer 5 designated by reference numeral 712 in the architecture 700 is of 2D convolution with a depth of 32 layers and kernel of 3×3 and receptive field of 31×31, and a leaky nonlinear Rectification Dilation of 16. The architecture continues via connector "D" to the next Layer 6, designated by reference numeral 714 (FIG. 7B). Layer 6 in the architecture 700 is of 2D convolution with a depth of 32 layers and kernel of 3×3 and receptive field of 127×127, and a leaky nonlinear Rectification Dilation of 32. Layer 7 designated by reference numeral 716 in the architecture 700 is of 2D convolution with a depth of 32 layers and kernel of 3×3 and receptive field of 255×255, and a leaky nonlinear Rectification Dilation of 64. Layer 8 designated by reference numeral 718 in the architecture 700 is of 2D convolution with a depth of 32 layers and kernel of 3×3 and receptive field of 510×510, and a leaky nonlinear Rectification Dilation of 128. Layer 9 designated by reference numeral 720 in the architecture 700 is of 2D convolution with a depth of 32 layers and kernel of 3×3 and receptive filed of 512×512, and a leaky nonlinear Rectification Dilation of 1. A Dropout Layer designated by reference numeral 722 in the architecture 700 is fully connected with a probability of 0.5. The next Layer 10 designated by reference numeral 724 in the architecture 700 is fully connected with a depth of N and a kernel of 3×3 and receptive filed of 512×512, and a leaky nonlinear Rectification Dilation of 1. The next layer is the output designated by reference numeral 726 with a multi-dimensional image, Time=T1 with 500 pixels×500 pixels×N bands. FIG. 10 illustrates a schematic diagram of the example deep neural network used for training dynamic data for use with the present system. The input image is illustrated as 500 pixels× 500 pixels×N channels deep (the diagram depicts 3 channels; however, it should be recognized that any number of channels may be used). Each of the layers 1 through 10 correspond to the architecture in FIGS. 7A and 7B.

Figure 8:
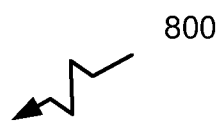
FIG. 8 is a graphical representation illustrating an example dynamic flow simulation, comparing a predicted image to a ground truth image as the simulation process progresses.
Figure 8:
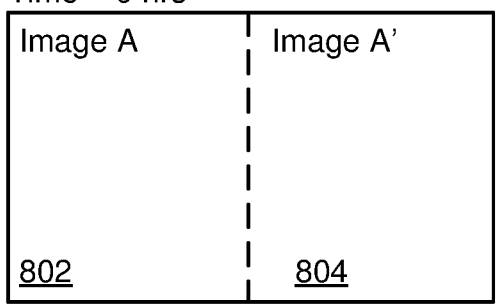
Figure 8:
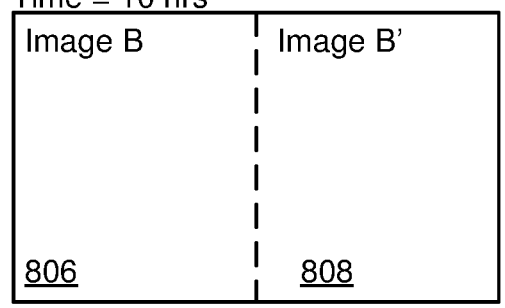
Figure 8:
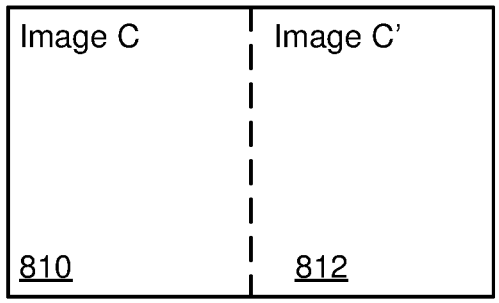
Figure 8:

FIG. 8 illustrates a graphical representation of a dynamic event progression, designated by reference numeral 800, illustrating an image flow, beginning at time=0 through time=24 hours. At time=0, a predicted image 802 (image A) may be displayed proximate to a ground truth image 804 (image A'). A ground truth image refers to the ideal or "true" state of a dynamic system. At time=10 hours, a predicted image 806 (image B) may be displayed proximate to a ground truth image 808 (image B'). At time=16 hours, a predicted image 810 (image C) may be displayed proximate to a ground truth image 812 (image C'). At time=24 hours, a predicted image 814 (image D) may be displayed proximate to a ground truth image 816 (image D'). This flow of images is merely for illustrative purposes. Comparison of the ground truth image to the predicted image reveals the error generated by the deep neural network.

Figure 9A:
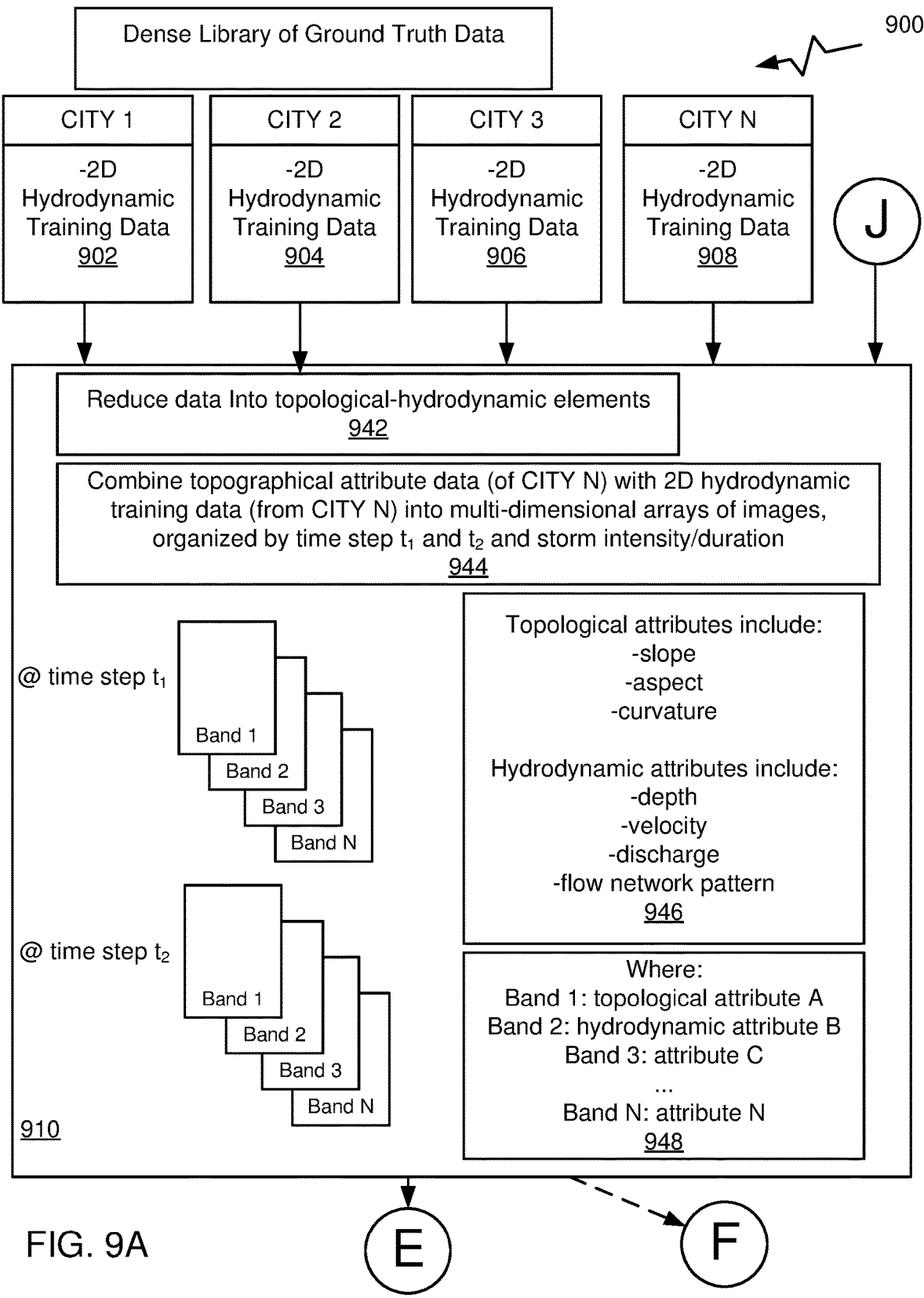
FIGS. 9A-9E illustrate a continuous flow chart illustrating an example method of creating a simulation for unknown cities from known data.

Referring now to FIGS. 9A-9E, a continuous flow chart illustrating an example method or process flow 900 for creating a simulation for "unknown cities" or "unknown domains" from "known" data is described. The term "known" used in this instance refers to training data exposed to the deep neural network. Within FIGS. 9A-9E, City 1-City N are designated as "known" domains; City X is designated, initially, as an "unknown" domain. At the conclusion of the continuous flow chart, City X-Revised is transformed from an "unknown" domain, to a "known" domain. The training data 602 (FIG. 6A) describes the topology and hydrodynamics of a specific geographic domain. Each of the operations described here are executed by the computer/processor 214 (FIG. 2A) based on executable code stored in the data storage (cloud) 218. Referring to FIG. 9A, a dense library of ground truth data is created and used. The dense library of ground truth data comprises 2D hydrodynamic training data gathered for City 1, as indicated by reference numeral 902. Similarly, 2D hydrodynamic training data gathered for City 2 is gathered, as indicated by reference numeral 904, 2D hydrodynamic training data gathered for City 3, as indicated by reference numeral 906, until any number of cities through City N is illustrated. For City N, 2D hydrodynamic training data 908 is gathered. The process 900 flows to a block of operations designated by reference numeral 910. This block of operations is implemented by executable code designed to first reduce the data into topological-hydrodynamic elements, designated by reference numeral 942, and second to combine both the topological attribute data (of CITY N) with 2D hydrodynamic training data (from CITY N) forming multi-dimensional arrays of images, organized by time step $t_1$ and $t_2$ and storm intensity/duration, as designated by reference numeral 944. The next block 946 illustrates that the topological attributes may include slope, aspect, and/or curvature. The 2D hydrodynamic attributes include depth, velocity, discharge, and flow network pattern. The next block 948 indicates the array of Bands from block 910, with the attributes for each. For example, Band 1 to Band N at time step $t_1$ may be represented by any of the attributes described in block 946. Similarly, Band 1 to Band N at time step $t_2$ may be sorted by any of the attributes described in block 946. By way of example, block 948 illustrates that Band 1 represents topological attribute A; Band 2 represents hydrodynamic attribute B; Band C represent attribute C; and Band N represents attribute N. The process flow 900, from block 910, continues via connector "E" and "F" to FIG. 9B.

Figure 9B:
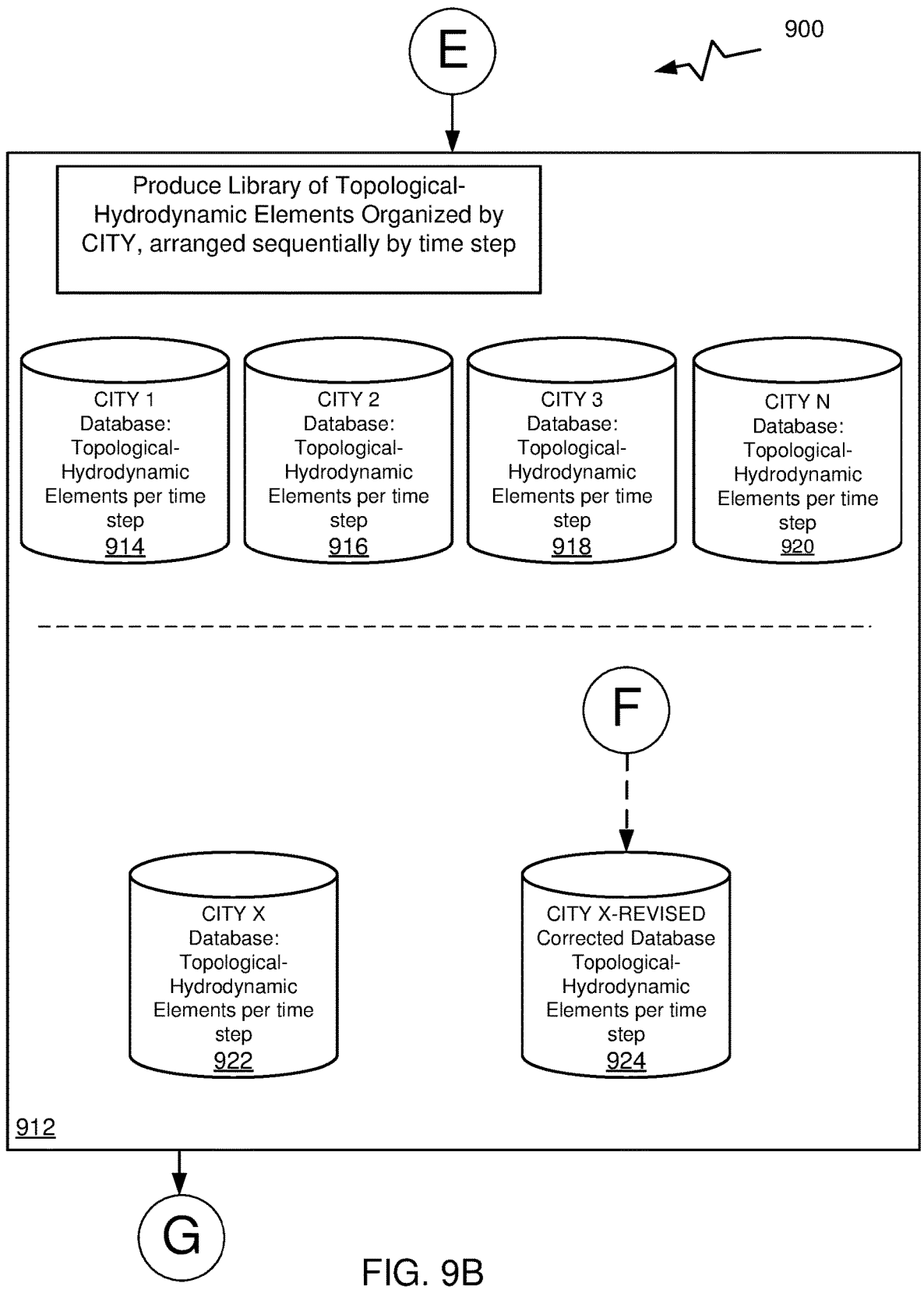

Referring now to FIG. 9B, the process flow 900 continues to block 912, including one or more operations, performed by executable code to produce a library of topological-hydrodynamic elements organized by CITY (in accordance with the illustrated example), arranged sequentially by time step. As one skilled in the art will recognize, the time step may be designated as needed. Within the block 912, a series of databases for each city is illustrated. The database for CITY 1, designated by reference numeral 914 stores topological-hydrodynamic elements per time step. The database for CITY 2, designated by reference numeral 916 stores topological-hydrodynamic elements per time step. The database for CITY 3, designated by reference numeral 918 stores topological-hydrodynamic elements per time step. The database for CITY N, designated by reference numeral 920 stores topological-hydrodynamic elements per time step.

The block 910 further includes a database for CITY X database including topological-hydrodynamic elements per time step. Also, the process flow 900, from FIG. 9A, via connector "F", proceeds to within block 912, to database for CITY X-REVISED, designated by reference numeral 924. The database 924 is a corrected database of topological-hydrodynamic elements per time step. The process flow 900 continues to FIG. 9C, via connector "G."

Figure 9C:
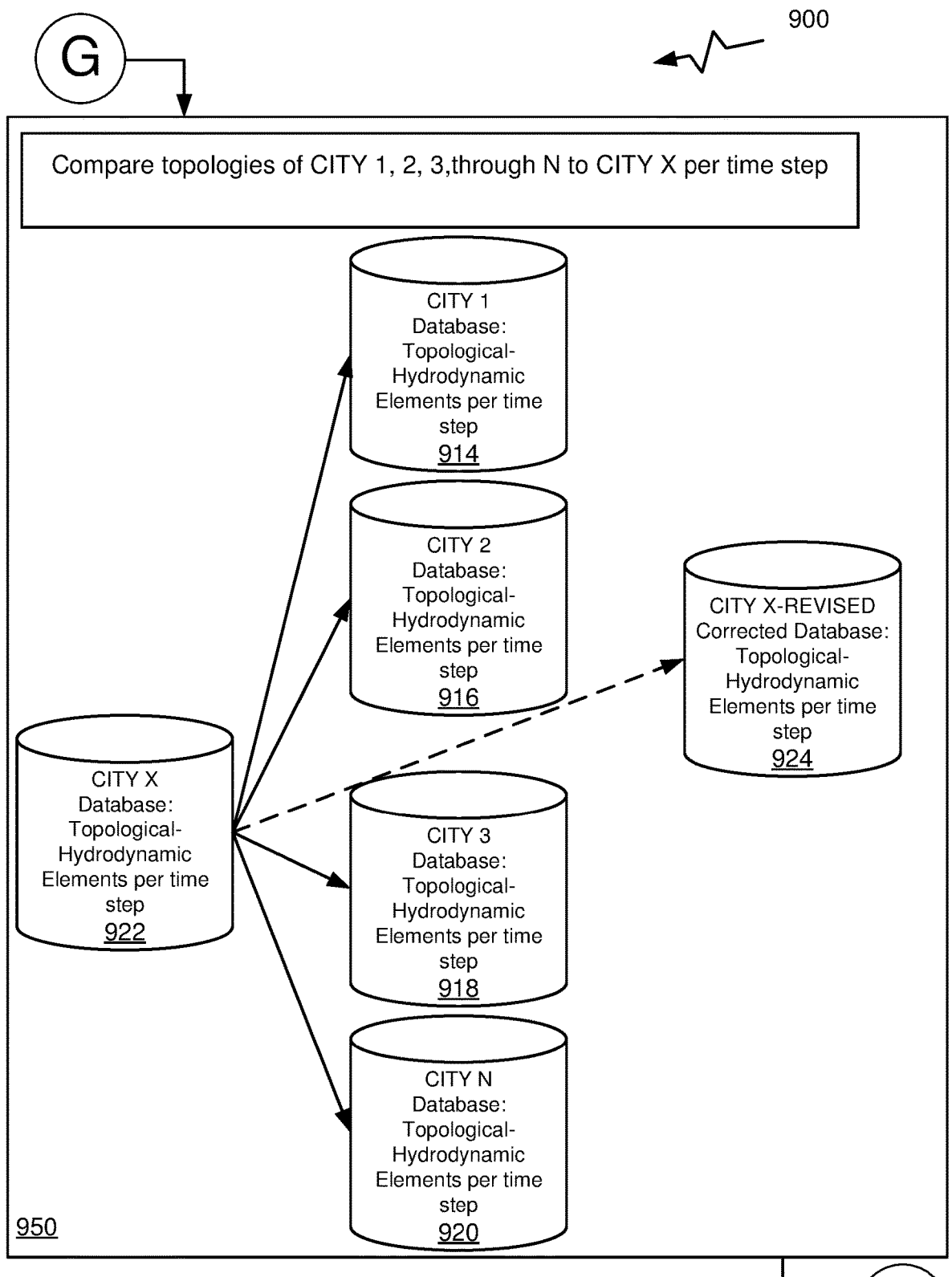

Referring to FIG. 9C, via connector "G," the process flow 900 proceeds to block 950 representing operations for comparing topologies of CITY 1, 2, 3, through N to CITY X per time step. It should be recognized that N represents any real integer, such that the present system may be scaled to map to any city in the world. The block 950 illustrates a database or database segment for CITY 1, CITY 2, CITY 3, through CITY N, each storing topological-hydrodynamic elements per time step. Each is designated by reference numerals 914, 916, 918, and 920, respectively, also shown in FIG. 9B. The database for CITY X, designated by reference numeral 922 stores topological-hydrodynamic elements per time and CITY X-Revised represents a corrected database including topological-hydrodynamic elements per time step. Executable operations of the process flow 900 continues via connector "H" to FIG. 9D.

Figure 9D:
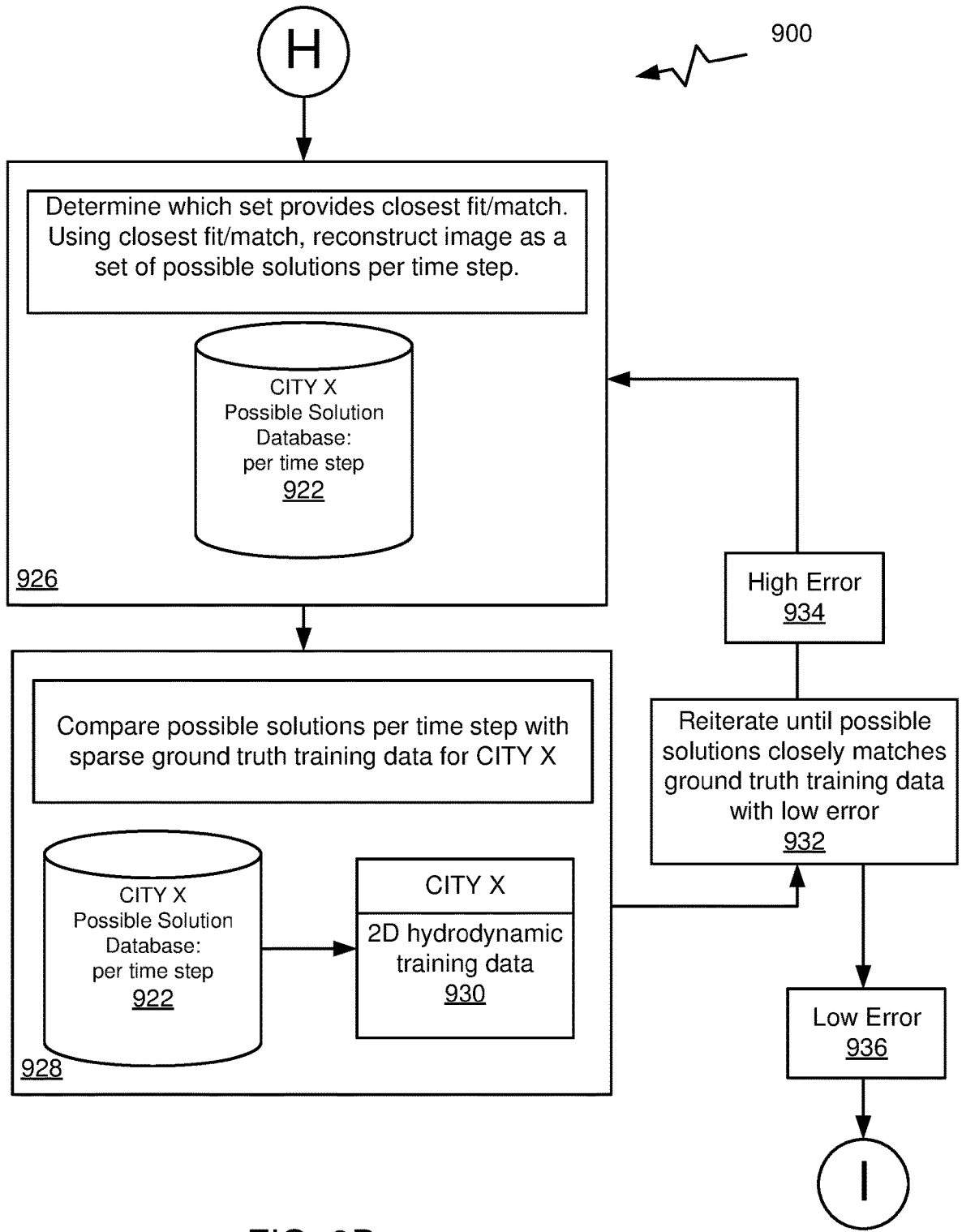

Referring now to FIG. 9D, the process flow 900 continues via connector "H" to a block 926 representing one or more executable operations for determining which set provides the closest fit or match and using the closes fit or match to reconstruct an image or array of image as a set of possible solutions per time step. The database 922 has a section referred to as a possible solution database per time step. The process 900 flows to the next block of executable operations configured to compare possible solutions per time step with sparse ground truth training data for CITY X. Data flow from the CITY X possible solution database 922 is configured to transmit to block 930 representing 2D hydrodynamic training data. The process flow 900 continues to block 932 of executable operations for reiterating until possible solutions closely match ground truth training data with low error. If high error is detected, as indicated by block 934, the flow returns to block 926, to continue through the same operations. If low error is detected, as represented by block 936, the process flow 900 continues via connector "I" to the next block of operations illustrated in FIG. 9E.

Figure 9E:
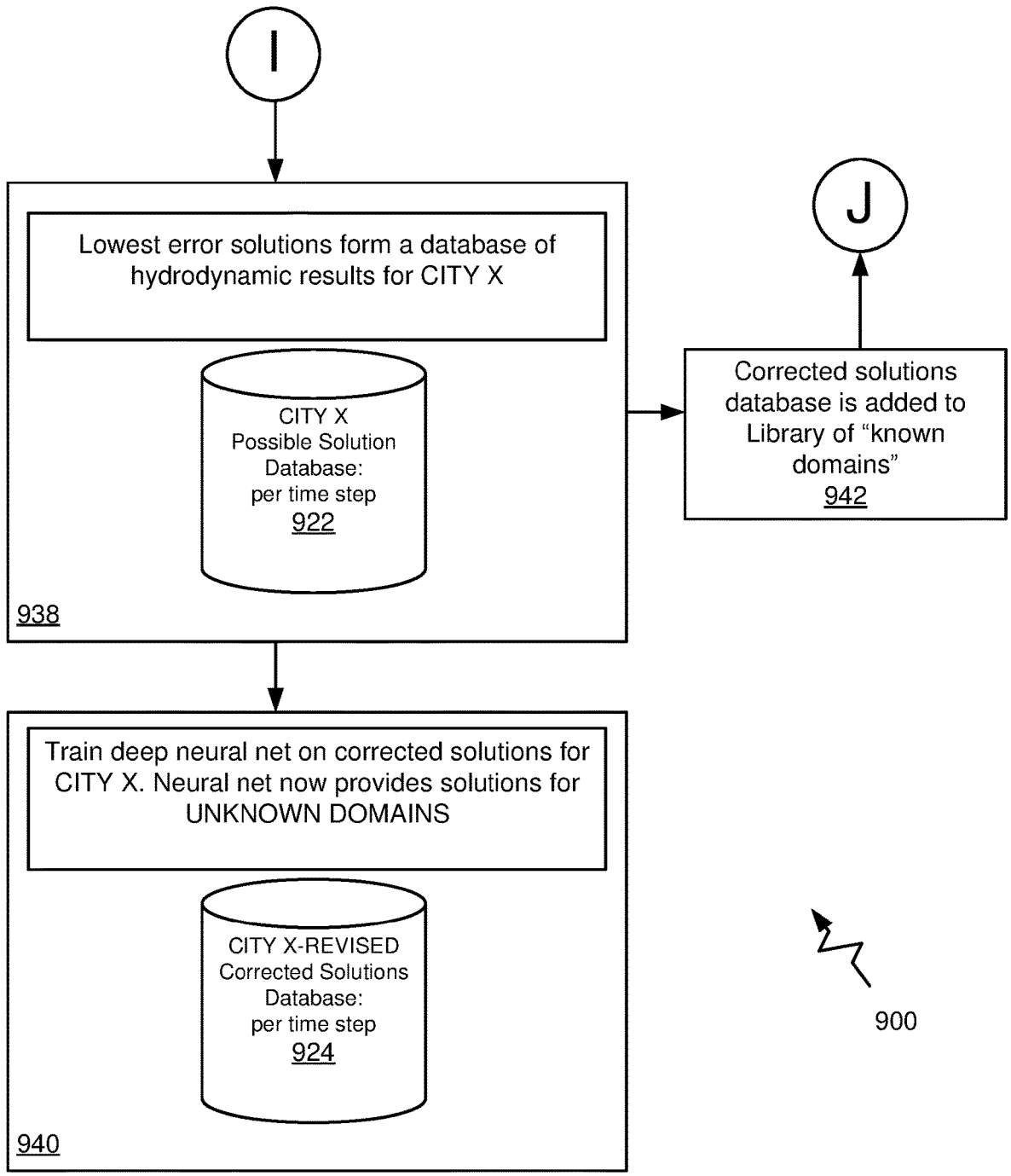

Referring now to FIG. 9E, the process flow 900 continues via connector "I," to the next block of operations 938, with executable code for using lowest error solutions to form a database of hydrodynamic result for CITY X. The database 922 is illustrated for use in this block of executable operations. The process flow 900 continues to the next block 942, including executable operation for taking the corrected solutions database and adding or integrating it with the library of "known domains." The process from there returns via connector "J" to block 910 in FIG. 9A. Alternatively, the process flow 900 from block 938 continues to the next block 940 of executable operations for training the deep neural net on corrected solution for CITY X. This neural net is configured to provide solutions for "unknown domains." This block 940 also illustrates the revised database for CITY X with corrected solutions per time step.

What is claimed is:

1. A dynamic-flow visualization and simulation system for a known geographic domain and an unknown geographic domain, comprising non-transitory computer-readable storage medium having computer-executable instructions stored thereon, which when executed by one or more processors, cause the one or more processors to perform operations, comprising:

receiving data representing a plurality of distinct attributes of terrain within a defined geographic region from multiple sources of known geographic domains;

providing a deep neural network (DNN), wherein the deep neural network (DNN) comprises an architecture consisting of:

multiple convolution layers of data applied with progressively increased dilation rates to expand a receptive field to include distant topographic influence data relevant to generating a flood prediction;

multiple leaky rectified linear functions operable within the multiple convolution layers to maintain neuron activity to facilitate robust gradient propagation during iterative training;

one or more dropout layers to enhance generalization of the deep neural network (DNN) to previously unseen data; and a final convolution layer configured to transform feature maps, using 1×1 convolution kernels to produce an output image comprising N discrete channels provided as a multi-band array of predicted flood conditions, each channel representing a predicted flood condition at a distinct future time interval;

training a plurality of training modules with a plurality of training data sets applied by the deep neural network (DNN) to simulate one or more segments of a small domain and a large domain, wherein the plurality of training data sets adaptively scale either up or down for use with the unknown geographic domain, wherein the plurality of training modules include:

a first library of training data derived from two-dimensional hydrodynamic simulated scenarios of an event occurring in one or more known geographic domains within the defined geographic region; and a second library of topological-hydrodynamic elements, wherein topological hydrodynamic elements are compiled by an urban area within the defined geographic region arranged sequentially by time step;

converting input data provided in real time for the unknown geographic domain via an interface coupled to the one or more processors, into a plurality of geographic domains of interest corresponding to the defined geographic region, wherein the input data is indicative of initial condition data derived from a storm event occurring in real time in the unknown geographic domain including data representative of a total duration of the storm event and rainfall intensity during the storm event;

applying the deep neural network (DNN) to determine predictive output data, by feeding the input data received for the unknown geographic domain in the defined geographic region by partitioning the known goegraphic domain into a plurality of the topological-hydrodynamic elements, and referencing, organizing, and arranging the plurality of the topological-hydrodynamic elements by time step into the multi-band array of the N discrete channels of images to continuously and iteratively train the plurality of training modules of the deep neural network (DNN);

assembling the multi-band array of the N discrete channels of images by the time step, to generate a plurality of time-dependent, physical prediction data within a sampled topological domain of interest formatted to display as a multi-band composite image, wherein an initial starting data set includes an initial water level at a designated time (t), and wherein the multi-band composite image is generated by at least three from a group of the multi-band array of predicted flood conditions including: an input topography, a flood inundation water depth at the designated time (t), a U-water velocity mapped on an x-axis component at designated time (t); a V-water velocity mapped on a y-axis component at the designated time (t); a cumulative rainfall at the designated time (t); a P-water flux [discharge] mapped on an x-axis component at the designated time (t); a Q-water flux indicative of discharge mapped on a y-axis component at the designated time (t); a water velocity [scalar] at the designated time (t); a water flow direction (radians) at the designated time (t); storm drain locations within input topography; a first environment feature within an input and output topography; and a second distinct environment feature within an input and output topography.

2. The dynamic-flow visualization and simulation system for the known geographic domain and the unknown geographic domain of claim 1, wherein the second library of topological-hydrodynamic elements is organized by the urban area within the defined geographic region arranged sequentially by the time step and the total duration of the storm event and the rainfall intensity during the storm event.

3. The dynamic-flow visualization and simulation system for the known geographic domain and the unknown geographic domain of claim 1, wherein the non-transitory computer-readable storage medium further comprises a library of ground truth image data including 2D hydrodynamic training data for a single bounded area representing the urban area.

4. The dynamic-flow visualization and simulation system for the known geographic domain and the unknown geographic domain of claim 3, wherein the 2D hydrodynamic training data is reduced into topological elements.

5. The dynamic-flow visualization and simulation system for the known geographic domain and the unknown geographic domain of claim 1, wherein a prediction engine generates a simulation of time-dependent events in a graphical representation of a dynamic event progression illustrating an image flow including a predicted image proximate a ground truth image beginning at the designated time of the initial water level through subsequent predetermined times.

6. The dynamic-flow visualization and simulation system for the known geographic domain and the unknown geographic domain of claim 1, wherein the one or more known geographic domains is further described by an attribute from the plurality of attributes of terrain including at least one of slope, aspect, and curvature.

7. The dynamic-flow visualization and simulation system for the known geographic domain and the unknown geographic domain of claim 1, wherein the one or more domains is further described by hydrodynamic attributes including at least one of depth, velocity, discharge, and a flow network pattern.

8. The dynamic-flow visualization and simulation system for the known geographic domain and the unknown geographic domain of claim 1, comprising the non-transitory computer-readable storage medium having computer-executable instructions stored thereon, which when executed by one or more processors, cause the one or more processors to perform operations, further comprising:

in one instance training the deep neural network (DNN) by data generated from 2D hydrodynamic modeling of the terrain using unstructured computational meshes, the data derived from a geographic area and comprised of components including at least one of the following components of: water depth, water velocity, water flux and water flow speed.

9. The dynamic-flow visualization and simulation system for the known geographic domain and the unknown geographic domain of claim 1, comprising the non-transitory computer-readable storage medium having computer-executable instructions stored thereon, which when executed by one or more processors, cause the one or more processors to perform operations, further comprising:

in one instance, training the deep neural network (DNN) trained by data generated from one or more libraries of at least one of remotely-sensed data and directly-received data describing a movement of at least one of water, air flow, and fire in any topography.

10. The dynamic-flow visualization and simulation system for the known geographic domain and the unknown geographic domain of claim 9, wherein the deep neural network (DNN) is configured to produce a multi-band database of images for a specified bounding area for all time step intervals of a user's requested storm duration and storm intensity.

11. A dynamic-flow visualization and simulation method for a known geographic domain and an unknown geographic domain, comprising:

receiving data representing a plurality of attributes of terrain within a defined geographic region from multiple sources of known geographic domains;

structuring a deep neural network (DNN) with multiple convolution layers applied with increased dilation rates to expand a receptive field to include distant topographic influence data relevant to generating a flood prediction, operable within the multiple convolution layers to maintain neuron activity to facilitate robust gradient propagation during iterative training, one or more dropout layers to randomly deactivate an output, to reduce neural network generalization to previously unseen data; and a final convolution layer configured to transform feature maps, using 1×1 convolution kernels to produce output image comprising N discrete channels (as a multi-band array) of predicted flood conditions, each channel representing a predicted flood condition at a distinct future time interval;

training a plurality of training modules with a plurality of training data sets applied by the deep neural network (DNN) to simulate one or more segments of a small domain and a large domain and adaptively scale the plurality of training data sets either up or down for use with the unknown geographic domain, wherein the plurality of training modules include a first library of training data derived from two-dimensional hydrodynamic simulated scenarios of an event occurring in one or more known domains within the defined geographic region and a second library of topological-hydrodynamic elements compiled by an urban area within the defined geographic region arranged sequentially by time step;

converting input data provided in real time for the unknown geographic domain via an interface coupled to a processor, into a plurality of geographic domains of interest corresponding to the defined geographic region, wherein the input data is indicative of initial condition data derived from a storm event occurring in real time in the unknown geographic domain including data representative of a total duration of the storm event and rainfall intensity of the storm event;

applying the deep neural network (DNN) to determine predictive output data, by feeding the input data received for the unknown geographic domain in the defined geographic region by further partitioning the known geographic domain into a plurality of topological-hydrodynamic elements, and referencing, organizing, and arranging the plurality of topological-hydrodynamic elements by time step into the multi-band array of the N discrete channels of images, wherein the multi-band array of images continuously and iteratively train the plurality of training modules of the deep neural network; and assembling the multi-band array of the N discrete channels of images by the time step, to generate a plurality of time-dependent, physical prediction data within a sampled topological domain of interest formatted as a multi-band composite image, wherein an initial starting data set includes an initial water level at a designated time (t), and wherein the multi-band composite images are generated by at least three from a group of the multi-band array of predicted flood conditions: an input topography, a flood inundation water depth at the designated time (t), a U-water velocity mapped on an x-axis component at designated time (t); a V-water velocity mapped on a y-axis component at the designated time (t); a cumulative rainfall at the designated time (t); a P-water flux [discharge] mapped on an x-axis component at the designated time (t); a Q-water flux indicative of discharge mapped on a y-axis component at the designated time (t); a water velocity [scalar] at the designated time (t); a water flow direction (radians) at the designated time (t); storm drain locations within input topography; a first environment feature within an input and output topography; and a second distinct environment feature within an input and output topography.

12. The dynamic-flow visualization and simulation method for the known geographic domain and the unknown geographic domain of claim 11, further comprising: applying at least one of probabilistically forecasting future predictive output data, a loss estimation engine, and an application programming interface (API).

13. The dynamic-flow visualization and simulation method for the known geographic domain and the unknown geographic domain of claim 11, further comprising:
providing a library of topological-hydrodynamic elements organized by the urban area within the defined geographic region arranged sequentially by time step and the total duration of the storm event and the rainfall intensity during the storm event.

14. The dynamic-flow visualization and simulation method for the known geographic domain and the unknown geographic domain of claim 11, further comprising:
creating a library of ground truth data by using 2D hydrodynamic training data for the urban area.

15. The dynamic-flow visualization and simulation method for the known geographic domain and the unknown geographic domain of claim 14, wherein the urban area represents at least a single bounded area.

16. The dynamic-flow visualization and simulation method for the known geographic domain and the unknown geographic domain of claim 14, wherein the 2D hydrodynamic training data is reduced into topographical elements.

17. The dynamic-flow visualization and simulation method for the known geographic domain and the unknown geographic domain of claim 11, wherein each urban area is further described by one or more attributes from the plurality of attributes of terrain including at least one of slope, aspect, and curvature.

18. The dynamic-flow visualization and simulation method for the known geographic domain and the unknown geographic domain of claim 11, wherein the known geographic domain is further described by one or more hydrodynamic attributes including at least one of depth, velocity, discharge, and a flow network pattern.

19. The dynamic-flow visualization and simulation for the known geographic domain and the unknown geographic domain of claim 11, wherein the deep neural network (DNN) is configured to produce a multi-band database of images for a specified bounding area for all time step intervals of a user's requested storm duration and storm intensity.

20. The dynamic-flow visualization and simulation method for the known geographic domain and the unknown geographic domain of claim 11, further comprising: generating a simulation of time-dependent events in a graphical representation of a dynamic event progression illustrating an image flow including a predicted image proximate a ground truth image beginning at the designated time of the initial water level through subsequent predetermined times.

* * * * *